(12) United States Patent
Senjalia

(10) Patent No.: US 8,898,197 B2
(45) Date of Patent: Nov. 25, 2014

(54) METHOD AND SYSTEM FOR CREATING A RELATIONSHIP STRUCTURE

(76) Inventor: Bhargav Senjalia, Dover, NJ (US)

( * ) Notice: Subject to any disclaimer, the term of this patent is extended or adjusted under 35 U.S.C. 154(b) by 546 days.

(21) Appl. No.: 13/113,596

(22) Filed: May 23, 2011

(65) Prior Publication Data

US 2012/0059861 A1    Mar. 8, 2012

Related U.S. Application Data

(60) Provisional application No. 61/379,529, filed on Sep. 2, 2010, provisional application No. 61/382,688, filed on Sep. 14, 2010.

(51) Int. Cl.
*G06F 17/30* (2006.01)

(52) U.S. Cl.
CPC ................ *G06F 17/30489* (2013.01)
USPC ............ 707/797; 707/798; 707/804; 717/157

(58) Field of Classification Search
USPC ................... 707/797, 798, 999.006, 999.101, 707/705–707, 795, 803, 804; 717/157
See application file for complete search history.

(56) References Cited

U.S. PATENT DOCUMENTS

| 7,197,517 | B2* | 3/2007 | Farrington et al. | 707/797 |
| 7,752,199 | B2* | 7/2010 | Farrell | 707/723 |
| 7,904,478 | B2* | 3/2011 | Yu et al. | 707/790 |
| 2011/0231429 | A1 | 9/2011 | Wada et al. | |
| 2011/0302113 | A1* | 12/2011 | Smith et al. | 706/12 |
| 2012/0005238 | A1* | 1/2012 | Jebara et al. | 707/798 |

OTHER PUBLICATIONS

Non-final Office Action for U.S. Appl. No. 13/113,579 mailed Oct. 19, 2012, 9 pages.
Final Office Action for U.S. Appl. No. 13/113,579, mailed Apr. 17, 2013, 11 pages.
Examiner's Answer for U.S. Appl. No. 13/113,579, mailed Nov. 29, 2013, 16 pages.

* cited by examiner

*Primary Examiner* — Marc Filipczyk
(74) *Attorney, Agent, or Firm* — Withrow & Terranova, PLLC

(57) ABSTRACT

A method and apparatus for generating a data structure. A plurality of entity reference relationship structures is accessed. Each entity reference relationship structure establishes a relationship between a different pair of entity structures of a plurality of entity structures. Each path from a first vertex to a second vertex that corresponds to a second entity structure is determined. For each path, all coupled sets of pairs of entity instance identifiers, wherein each coupled set comprises a pair of entity instance identifiers from each entity reference relationship structure corresponding to the path are identified. For each coupled set, a first entity instance identifier in the each coupled set that refers to the first entity structure and a second entity instance identifier in the each coupled set that refers to the second entity structure are stored in association with one another in a new entity reference relationship structure.

14 Claims, 29 Drawing Sheets

| ENTITIES | | | NUM ENTITIES |
|---|---|---|---|
| PRODUCT | VENDOR | STORE | 3 |
| PRODUCT | | STORE | CUSTOMER | 3 |
| PRODUCT | VENDOR | STORE | 2 |
| PRODUCT | | | CUSTOMER | 2 |
| PRODUCT | | STORE | CUSTOMER | 2 |
| | VENDOR | STORE | 2 |

*FIG. 9*

METHOD AND SYSTEM FOR CREATING A RELATIONSHIP STRUCTURE

RELATED APPLICATIONS

This application claims the benefit of and priority to provisional patent application Ser. No. 61/379,529, filed Sep. 2, 2010, and provisional patent application Ser. No. 61/382,688, filed Sep. 14, 2010, the disclosures of which are hereby incorporated herein by reference in their entirety.

FIELD OF THE DISCLOSURE

Embodiments disclosed herein relate to relationships among data, and in particular to automatically generating an entity reference relationship structure that identifies relationships between entity instances in two entity structures.

BACKGROUND

Databases are used to store information. Databases are frequently organized, or modeled, based on an abstraction referred to as an "entity." Each entity models a thing that is relatively distinct from another thing. One example is that of a company database. For example, a company database may be organized based at least in part on an employee entity which is used to model employees of the company, an office entity which is used to model office space of the company, and a desk entity used to model desks used by its employees.

An entity is typically implemented in tangible form via a corresponding entity structure. Thus, in the example above, the company database may include an employee entity structure, an office entity structure and a desk entity structure. Each entity structure includes entity instances that correspond to a particular thing being modeled. Thus, the employee entity structure has a number of employee entity instances, each of which corresponds to a particular employee, the office entity structure has a number of office entity instances, each of which corresponds to a particular office, and the desk entity structure has a number of desk entity instances, each of which corresponds to a particular desk.

It may be beneficial to understand the relationships between entity instances of a pair of entity structures in a database. However, there may be no information in the database that directly identifies the relationships between entity instances of one entity structure and the entity instances of a second entity structure. Consequently, generating relationship data, such as a relationship table, that identifies the relationships between entity instances of one entity structure and the entity instances of a second entity structure may be a largely manual process, requiring human knowledge about the entity instances stored in the database, and requiring human input to generate such a structure. This can be time-consuming and therefore costly.

Sometimes the relationship between entity instances in one entity structure and entity instances in another entity structure is necessarily one-to-one. For instance, the company may be structured such that each office has only a single desk, and any desk can only be in one office. Similarly an employee may be associated with at most one office, and each office may only be associated with one employee. Groups of entity structures so related may be referred to as a one-to-one ("1:1") entity structure group. Some of the relationships between two entity structures in a 1:1 entity structure group may be identified in the database, and others not. For example, in the above 1:1 entity structure group, an employee-office relationship table might identify for each particular employee entity instance in the employee entity structure the particular office entity instance in the office entity structure with which the particular employee entity instance is related. Further an office-desk relationship structure might identify for each particular office entity instance in the office entity structure the particular desk entity instance in the desk entity structure with which the particular office entity instance is related. However, it may be desirable to have an employee-desk relationship table that identifies the relationships between employee entity instances and desk entity instances. Generating such an employee-desk relationship table would typically require human knowledge, as discussed above, about the relationships between employees and offices, and offices and desks, and further require special software development skills necessary to develop a program to generate such a structure.

Accordingly, what is needed is a mechanism for automatically generating a relationship table that identifies the relationships between entity instances of a first entity structure in a 1:1 entity structure group, and entity instances of a second entity structure in the 1:1 entity structure group.

SUMMARY

Embodiments disclosed herein relate to a database relationship analyzer which analyzes a database and generates entity reference relationship tables that identify relationships between a first entity structure and a second entity structure in a group of entity structures referred to herein as a one-to-one ("1:1") entity structure group. A 1:1 entity structure group comprises at least three entity structures, wherein entity instances of each entity structure have a 1:1 relationship with entity instances of at least one other entity structure in the group. The database also contains entity reference relationship tables that comprise pairs of entity instance identifiers that establish a relationship between entity instances of a pair of entity structures. However, the database does not contain an entity reference relationship table that identifies the relationships between entity instances of the first entity structure and the second entity structure.

Based on the entity relationship tables, one or more paths from a first vertex that corresponds to the first entity structure through at least one intermediate vertex that corresponds to an intermediate entity structure to a second vertex that corresponds to the second entity structure may be determined. The path comprises a plurality of edges which connect vertices in the path, and each such edge corresponds to an entity reference relationship structure that establishes a relationship between the two entity structures that correspond to the two vertices.

For each identified path, all coupled sets of pairs of entity instance identifiers are identified. Each coupled set comprises a pair of entity instance identifiers from each entity reference relationship structure corresponding to the path. For each coupled set, a first entity instance identifier in the each coupled set that refers to the first entity structure and a second entity instance identifier in the each coupled set that refers to the second entity structure is stored in association with one another in an entity reference relationship structure, thereby forming an entity reference relationship table that identifies the relationships between entity instances of the first entity structure and the second entity structure.

In one embodiment, coupled sets of pairs of entity instance identifiers comprise one pair of entity instance identifiers from each entity reference relationship structure corresponding to the path, and at least one entity instance identifier from each pair of entity instance identifiers in the coupled set matches an entity instance identifier from another pair of entity instance identifiers in the coupled set.

Among other features, the database relationship analyzer disclosed herein eliminates a need to develop specialized software applications that may otherwise be developed to identify relationships between entity instances of two entity structures in a database, and, using known relationship data identifying relationships between entity instances of pairs of entity structures, can automatically generate an entity reference relationship structure that identifies relationships between a first entity structure and a second entity structure. Those skilled in the art will appreciate the scope of the disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 is an exemplary structure which may be formed by the database relationship analyzer identifying the entities that correspond to each of the complete graphs illustrated in FIG. 7;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to data analysis, and in particular to generating an entity relationship structure that identifies the relationships among entity instances associated with a number of different entities in a database. For purposes of illustration, embodiments will be illustrated in the context of a relational database, but the embodiments are not limited to any particular form of database. As used herein, the term "database" refers to any data structure suitable for retaining information, such as a file, a spreadsheet, a database management system, or the like.

Figure 1:
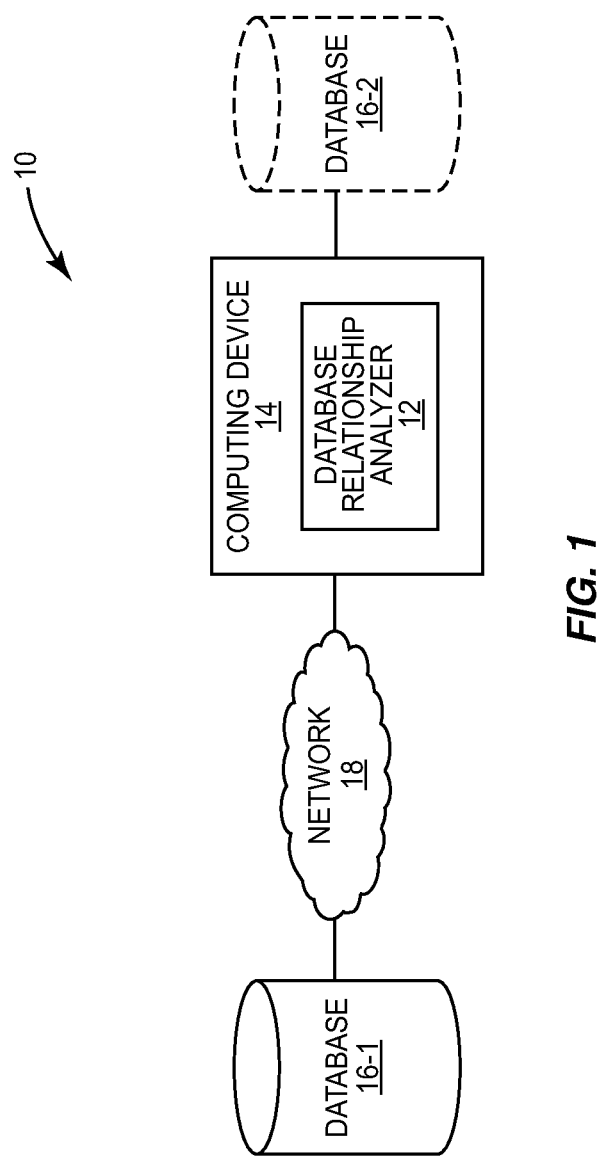
FIG. 1 is a block diagram of an exemplary system in which embodiments disclosed herein may be practiced.

FIG. 1 is a block diagram of an exemplary system in which embodiments disclosed herein may be practiced. The system 10 includes a database relationship analyzer 12 that executes on a computing device 14, such as a computer. The database relationship analyzer 12 accesses information associated with a database 16-1 via communication with a network 18. Alternately, the database relationship analyzer 12 may access information associated with a locally connected database 16-2, as illustrated in dashed outline in FIG. 1.

Generally, as discussed in greater detail with reference to the subsequent figures, the database relationship analyzer 12 accesses information from the database 16-1 that identifies relationships between particular entities of the database 16-1, and based on this information, the database relationship analyzer 12 generates a structure, such as a database table, that contains information identifying relationships among the entity instances of the particular entities. This information may then be used in any desirable manner, such as for advertising, marketing, or any other endeavor in which knowledge of such relationships would be useful.

Figure 2:
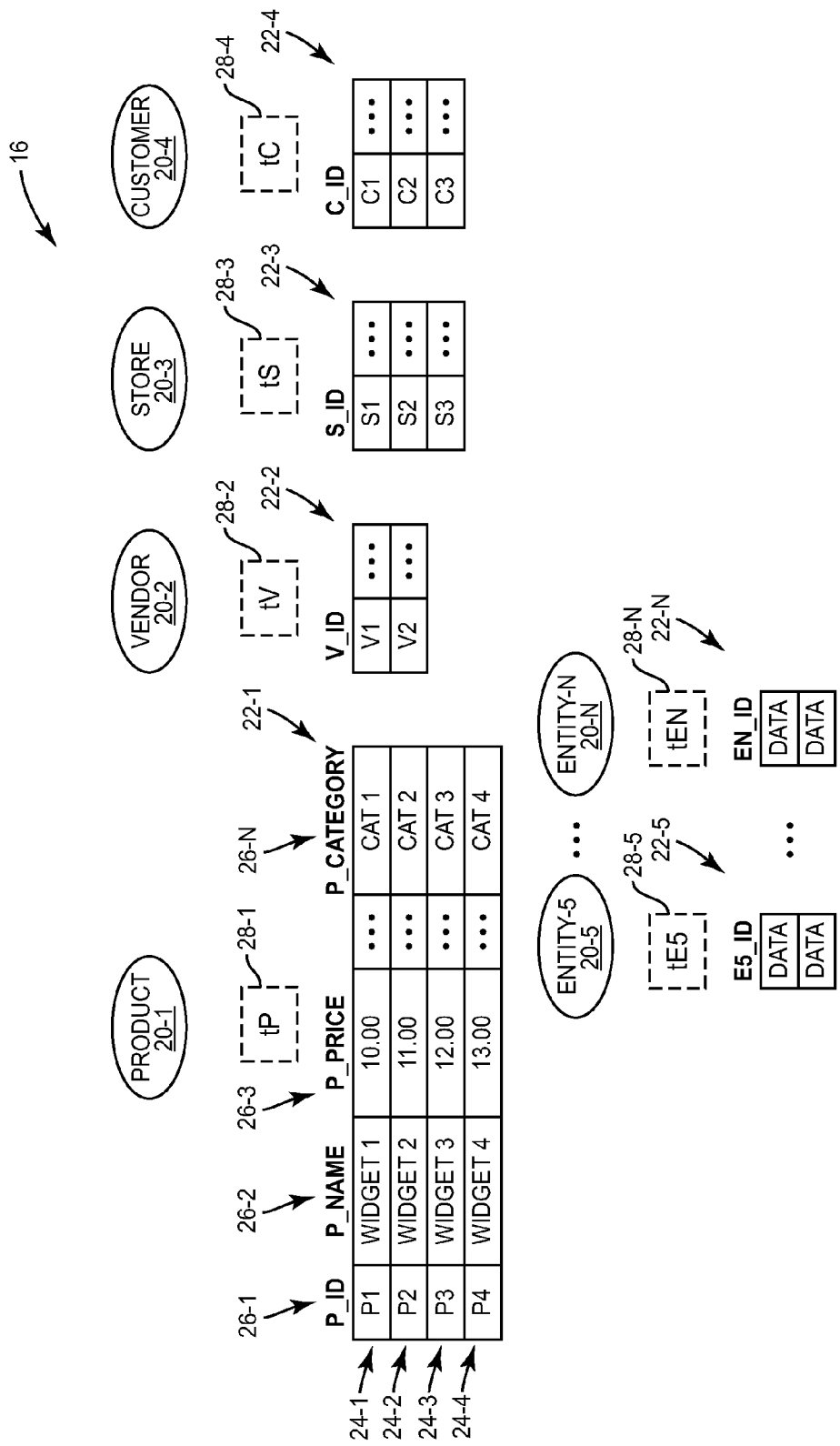
FIG. 2 is a block diagram illustrating aspects of an exemplary database.

FIG. 2 is a block diagram illustrating aspects of an exemplary database 16. The database 16 models a plurality of entities 20-1-20-N (generally, entities 20). In database terminology, an entity is an abstraction that represents a discrete thing (although not necessarily a physical thing) in a particular context. For example, in the database 16, the entities 20-1-20-4 represent, respectively, products, vendors, stores, and customers in a product retailer context. Entities 20-5-20-N may represent any other distinct things that may be useful in the product retailer context, and are illustrated to emphasize that while for purposes of illustration, the embodiments will be disclosed in the context of relationships among four entities 20-1-20-4, the embodiments are not limited to any particular number of entities 20, and may be used to analyze the relationships among any number of entities 20. The use of ellipses throughout the Figures indicates the presence of zero or more additional elements that may be present, but for purposes of clarity and brevity, are not illustrated.

Abstract entities 20-1-20-N are implemented in tangible form in the database 16 via corresponding entity structures 22-1-22-N (generally entity structures 22). An entity structure 22 may be implemented in any desired format, however, for purposes of illustration, the entity structures 22 will be described as having a tabular format having one or more rows of information and one or more columns of information. Each row in an entity structure 22 represents an entity instance of that particular entity 20. Each entity instance corresponds to a particular one, or instance, of the thing being modeled by that particular entity 20.

For example, the entity structure 22-1 contains four entity instances 24-1-24-4 (generally, entity instances 24), each of which corresponds to a particular (different) product. Data about an entity instance are referred to as attributes of the entity. With respect to an entity structure 22, attribute data about an entity is typically illustrated in a columnar fashion. Each entity attribute typically has an attribute name. The entity attribute names are preferably indicative of the information stored in the entity attribute of a particular instance of the entity. Referring to the entity structure 22-1, for example, entity attributes include "P_ID," which is a unique identifier that uniquely identifies the product corresponding to the particular entity instance 24; "P_NAME," which is the name of the product corresponding to the particular entity instance 24; "P_PRICE," which is the retail price of the product corresponding to the particular entity instance 24; and "P_CATEGORY," which is the product category of the product corresponding to the particular entity instance 24.

The attribute data associated with the respective entity attribute are illustrated in corresponding columns 26-1-26-N of the entity structure 22-1. Thus, the attribute data associated with the entity attribute P_ID of entity instance 24-1 is "P1," the attribute data associated with the entity attribute P_NAME is "WIDGET 1," the attribute data associated with the entity attribute P_PRICE is $10.00, and the attribute data associated with the entity attribute P_CATEGORY is "CAT 1."

Each entity structure 22-1-22-N also typically has a corresponding structure name 28-1-28-N, which may be used, for example, by database software to perform operations on the data contained in the entity structure. For example, entity structure 22-1 has a structure name 28-1 "tP," entity structure 22-2 has a structure name 28-2 "tV," entity structure 22-3 has a structure name 28-3 "tS," and entity structure 22-4 has a structure name 28-4 "tC."

Similarly, as discussed with regard to the entity structure 22-1, the entity structures 20-2-20-N include one or more entity instances, each of which contains attribute data associated with that particular entity. For purposes of illustration and clarity, hereinafter the entity structures 22-1-22-4 will be depicted as having only a single entity attribute, in particular a unique identifier attribute that uniquely identifies each particular entity instance of a particular entity structure 22, distinguishing the entity instance from every other entity instance of that particular entity structure 22, although it will be apparent to those skilled in the art that the entity instances of the entity structures 22-1-22-4 would likely have more than one entity attribute. Such unique attributes will be referred to herein as unique entity instance identifiers. With respect to the entity structure 22-1, the unique entity instance identifier is the P_ID entity attribute; with respect to the entity structure 22-2, the unique entity instance identifier is the V_ID entity attribute; with respect to the entity structure 22-3, the unique entity instance identifier is the S_ID entity attribute; and with respect to the entity structure 22-4, the unique entity instance identifier is the C_ID entity attribute.

Because an entity 20 is an abstraction used to model a thing, and an entity structure 22 comprises data that identify one or more particular occurrences of the thing, hereinafter reference will be made to entity structures 22 rather than entities 20 because the database relationship analyzer 12 operates on data, not abstractions. However, it should be borne in mind that each entity structure 22 corresponds to a particular entity 20. Also, for purposes of clarity, a reference to an entity instance or an entity structure 22 may be preceded by the particular entity type of the entity instance or entity structure 22 hereinafter. For example, the entity structure 22-1 may be referred to as the product entity structure 22-1, and an entity instance stored in the product entity structure 22-1 may be referred to as a product entity instance 24.

For purposes of illustration and clarity, references may be made herein from time to time to entity instances of an entity 20. Any such reference means that the entity instance is of the type of entity 20, and the actual data that define the entity instance is maintained in a corresponding entity structure 22. For example, a reference to an entity instance of the product entity 20-1 means that the entity instance corresponds to a particular product, and the data that defines the particular entity instance is stored in the entity structure 22-1.

Entity instances of one entity structure 22 may have relationships with entity instances of another entity structure 22. Some relationships among entity instances may be relatively obvious, and others, less so. For example, a customer entity instance of the customer entity structure 22-4 has a relationship with a particular product entity instance 24 of the product entity structure 22-1 if the customer corresponding to the customer entity instance purchased the product corresponding to the particular product entity instance 24. This information may be valuable to the retailer because it may provide the retailer with potentially useful information about the customer, such as the fact that the customer may be a country music fan if the product is a country music CD. The product entity instance 24 is also related to a particular store entity instance of the store entity structure 22-3 by virtue of the fact that the product was sold by the particular store that corresponds to that store entity instance. Notably, this latter relationship actually suggests a relationship between the particular customer entity instance and the particular store entity instance in that the particular customer purchased the country music CD from the particular store.

Understanding the relationships among entity instances can be valuable. For example, a retailer may be able to send specific and highly relevant offers to a particular customer if the retailer knows that the customer shops at a particular retailer location, or purchases particular categories of products. Consequently, it is not unusual for a database owner to want to know what relationships exist among the entity instances in a database.

Determining relationships among entity instances may be relatively simple where a database models only a few types of entities. However, in practice, databases may model hundreds of different types of entities. Determining all the relationships among entity instances of hundreds of different entity structures 22 may be quite time-consuming, and once determined, writing the software reporting application(s) necessary to extract the data from the entity structures 22 in accordance with the determined relationships is also time-consuming and may be expensive.

According to one embodiment, the database relationship analyzer 12 (FIG. 1) operates to access entity reference relationship structures, each of which defines relationships between entity instances of pairs of entity structures 22, and based on this information, generates an entity relationship structure that identifies all relationships between all entity instances of all entity structures 22 referenced by the entity reference relationship structures. In other words, the database relationship analyzer 12 can automatically identify all unique combinations of entity instances of all entity structures 22 referenced by the entity reference relationship structures, and can identify such combinations in an entity relationship structure.

Figure 3:
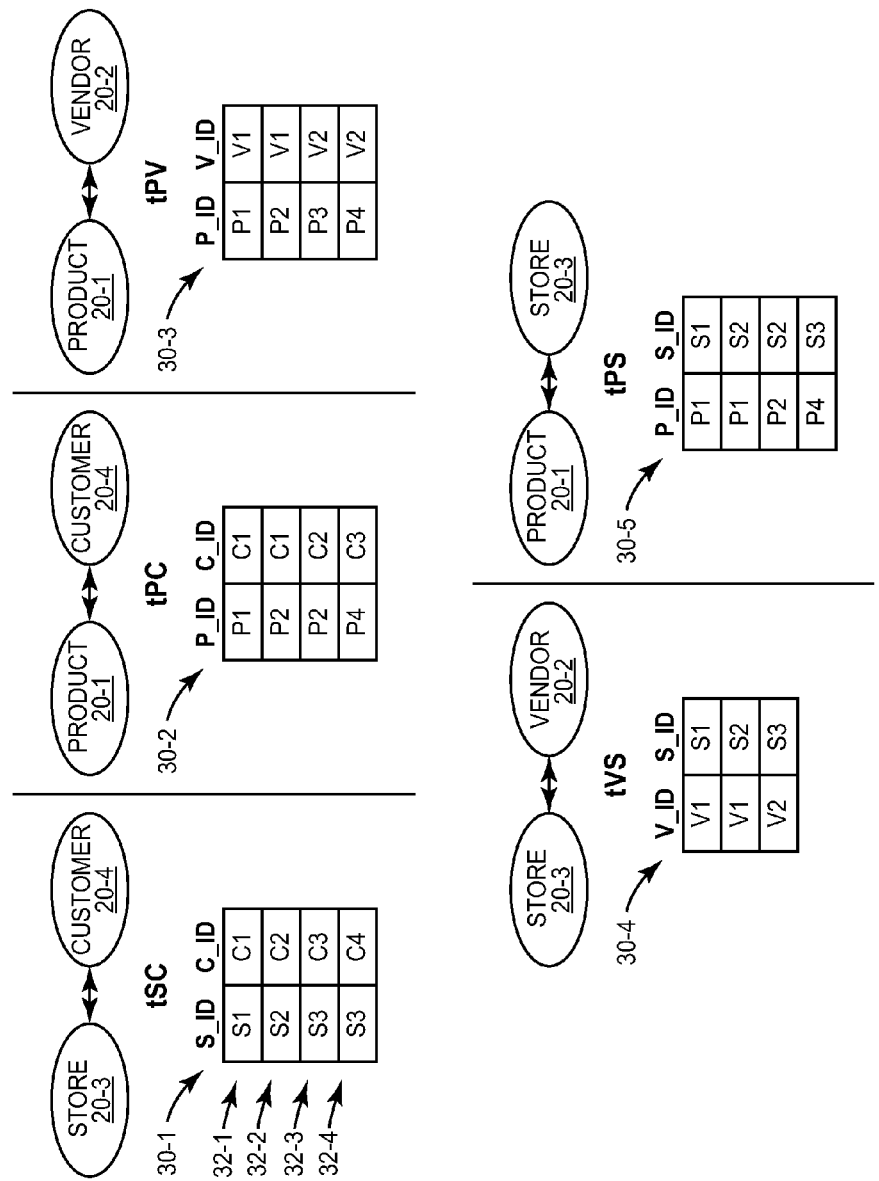
FIG. 3 is a block diagram illustrating exemplary entity reference relationship structures according to one embodiment.

FIG. 3 is a block diagram illustrating exemplary entity reference relationship structures according to one embodiment. FIG. 3 will be discussed in conjunction with FIGS. 1 and 2. FIG. 3 illustrates five exemplary entity reference relationship structures 30-1-30-5 (generally, entity reference relationship structures 30). Each of the entity reference relationship structures 30 comprises a dual column, multiple-row table wherein each row contains data identifying a relationship between entity instances of two different entity structures 22, and each column of the row corresponds to a unique entity attribute that uniquely identifies the entity instance of one of two different entity structures 22. Each of the entity reference relationship structures 30 thereby establishes a relationship between the two different entity structures 22. For example, the entity reference relationship structure 30-1 comprises a plurality of rows 32-1-32-4, each of which identifies a relationship between an entity instance of the store entity structure 22-3 (FIG. 2) and the customer entity structure 22-4 (FIG. 2). Thus, it may be said that the store entity structure 22-3 and the customer entity structure 22-4 correspond to the entity reference relationship structure 30-1. The entity reference relationship structure 30-1 may also have a name, as illustrated herein as "tSC." In particular, the row 32-1 indicates there is a relationship between a store entity instance of the store entity structure 22-3 that has a unique entity instance identifier (S_ID) 51, and a customer entity instance of the customer entity structure 22-4 that has a unique entity instance identifier (C_ID) C1. A row of an entity reference relationship structure 30 may also be referred to as a pair of entity instance identifiers, since each row in an entity reference relationship structure 30 comprises two entity instance identifiers.

Similarly, the entity reference relationship structure 30-2 (i.e., "tPC") has rows, or pairs, of entity instance identifiers identifying relationships between product entity instances of the product entity structure 22-1 and customer entity instances of the customer entity structure 22-4. The entity reference relationship structure 30-3 (i.e., "tPV") has rows of entity instance identifiers identifying relationships between product entity instances of the product entity structure 22-1 and vendor entity instances of the vendor entity structure 22-2. The entity reference relationship structure 30-4 (i.e., "tVS") has rows of entity instance identifiers identifying relationships between store entity instances of the store entity structure 22-3 and vendor entity instances of the vendor entity structure 22-2. The entity reference relationship structure 30-5 (i.e., "tPS") has rows of entity instance identifiers identifying relationships between product entity instances of the product entity structure 22-1 and store entity instances of the store entity structure 22-3.

Figure 4:
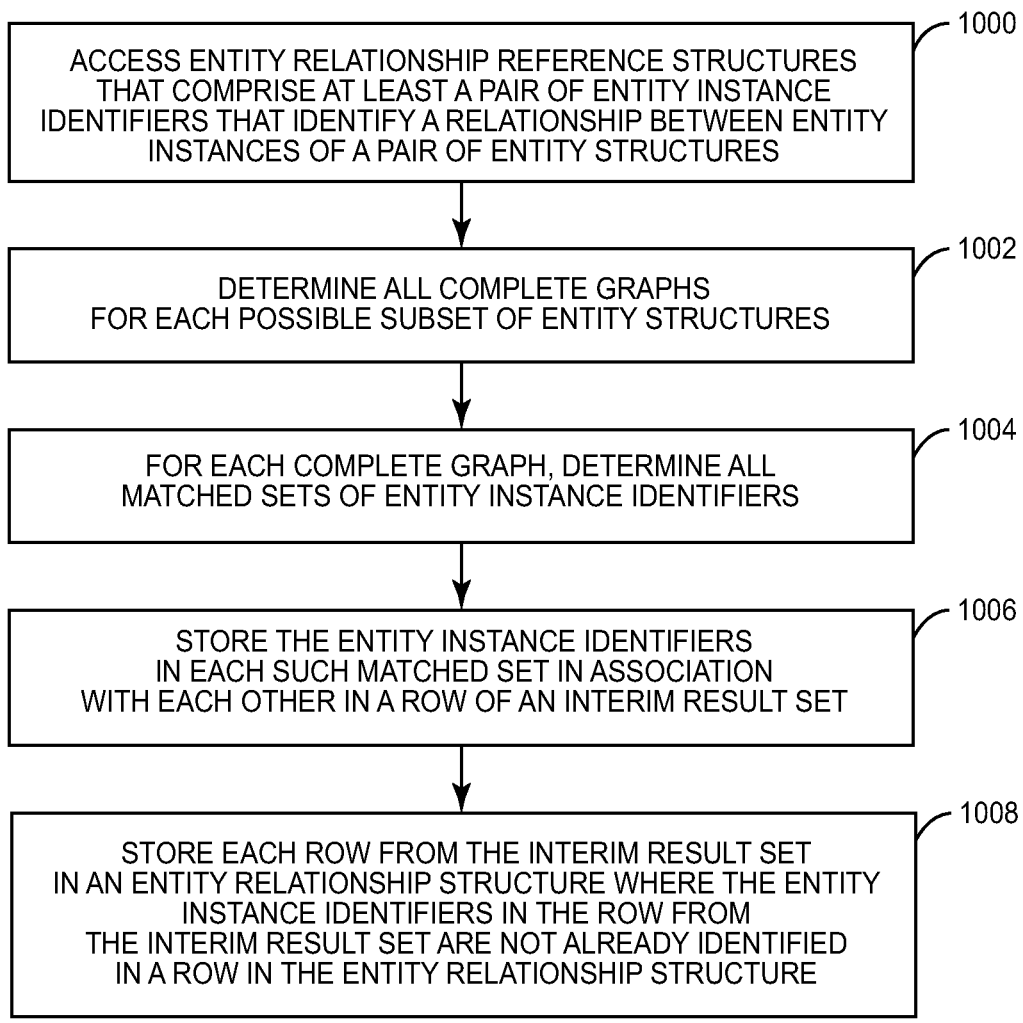
FIG. 4 is flowchart illustrating steps by which a database relationship analyzer can determine the relationships among entity instances of a plurality of entity structures according to one embodiment.

FIG. 4 is flowchart illustrating steps by which the database relationship analyzer 12 (FIG. 1) can determine the relationships among entity instances of a plurality of entity structures 22 according to one embodiment. FIG. 4 will be discussed in conjunction with FIGS. 2-10. Assume that the database owner of the database 16 (FIG. 2) desires to know the relationships among the entity instances of the entity structures 22-1-22-4. Assume further that the entity reference relationship structures 30-1-30-5 (FIG. 3) identify the relationships between entity instances of pairs of the entity structures 22-1-22-4, as discussed above. Initially, the database relationship analyzer 12 accesses the entity reference relationship structures 30-1-30-5 (FIG. 4, step 1000). The entity reference relationship structures 30 may be generated in any suitable manner. In one embodiment, the entity reference relationship structures 30 are database tables in the database 16 that are updated as data is entered into the database 16 during the normal operation of the database 16. Alternately, the entity reference relationship structures 30 may be generated in preparation for providing the data to the database relationship analyzer 12, either via user input, or by database table generation operations performed against one or more of the entity structures 22.

Based on the unique entity instance identifiers of the entity reference relationship structures 30, the database relationship analyzer 12 may determine which pairs of the entity structures 22 correspond to each entity reference relationship structure 30, or the database relationship analyzer 12 may also access data that identifies which pair of entity structures 22 corresponds to each entity reference relationship structure 30. For example, the database relationship analyzer 12 may access data that indicates that the entity reference relationship structure 30-1 (tSC) corresponds to the entity structures 22-3 (tS) and 22-4 (tC). This information may be maintained in a configuration file, entered by a user via a user interface, or accessed in any other desirable manner.

The database relationship analyzer 12 then determines certain relationships among the entity structures 22-1-22-4 based on the entity reference relationship structures 30. In particular, the database relationship analyzer 12 determines all complete graphs for each possible subset of entity structures 22-1-22-4, wherein each complete graph has at least one edge that corresponds to an entity reference relationship structure 30, and two vertices connected by the edge that correspond to a pair of entity structures 22 between which the entity reference relationship structure 30 establishes a relationship (FIG. 4, step 1002). This process can be illustrated with reference to FIG. 5, which illustrates a graph 34 identifying relationships among the entity structures 22-1-22-4 based on the entity reference relationship structures 30. In the graph 34, each vertex represents, or corresponds to, a particular entity structure 22, and each edge represents, or corresponds to, a particular entity reference relationship structure 30. Because the graph 34 is a representation of the entity structures 22 and entity reference relationship structures 30, the vertices and edges in the graph 34 will be identified using the same element reference numerals associated with the structures to which the vertex or edge correspond, with a suffix of "E" for an edge and "V" for a vertex.

While for purposes of illustration and convenience, graph terms and concepts, such as complete graphs, vertices, edges, and the like are used herein to describe methods and processes for identifying associations between related structures and representing such associations, such use is for explanatory purposes only. Accordingly, the invention is not limited to the use of graph concepts for determining such relationships and associations, and may be implemented via any mechanism which can ascertain and/or represent the associations and relationships discussed herein.

Figure 5:
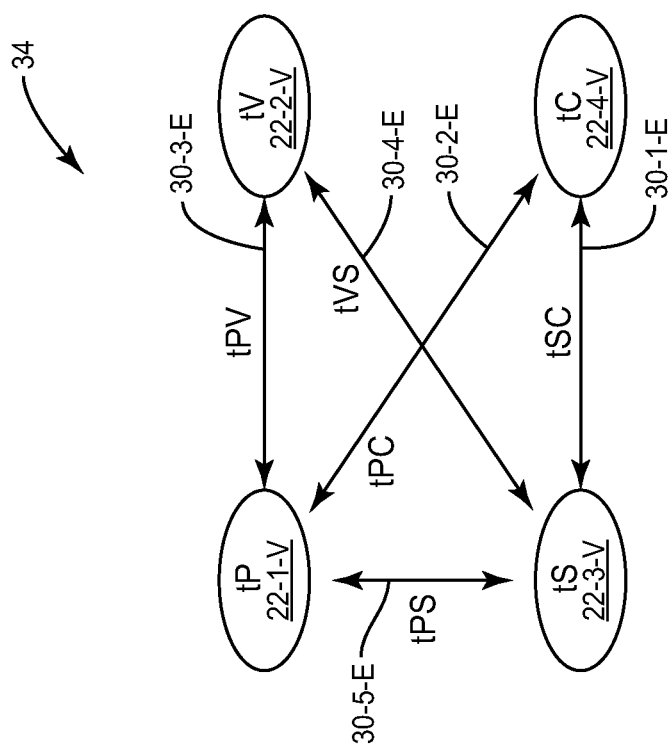
FIG. 5 illustrates an exemplary graph that identifies relationships among the entity structures based on entity reference relationship structures.
Figure 6:
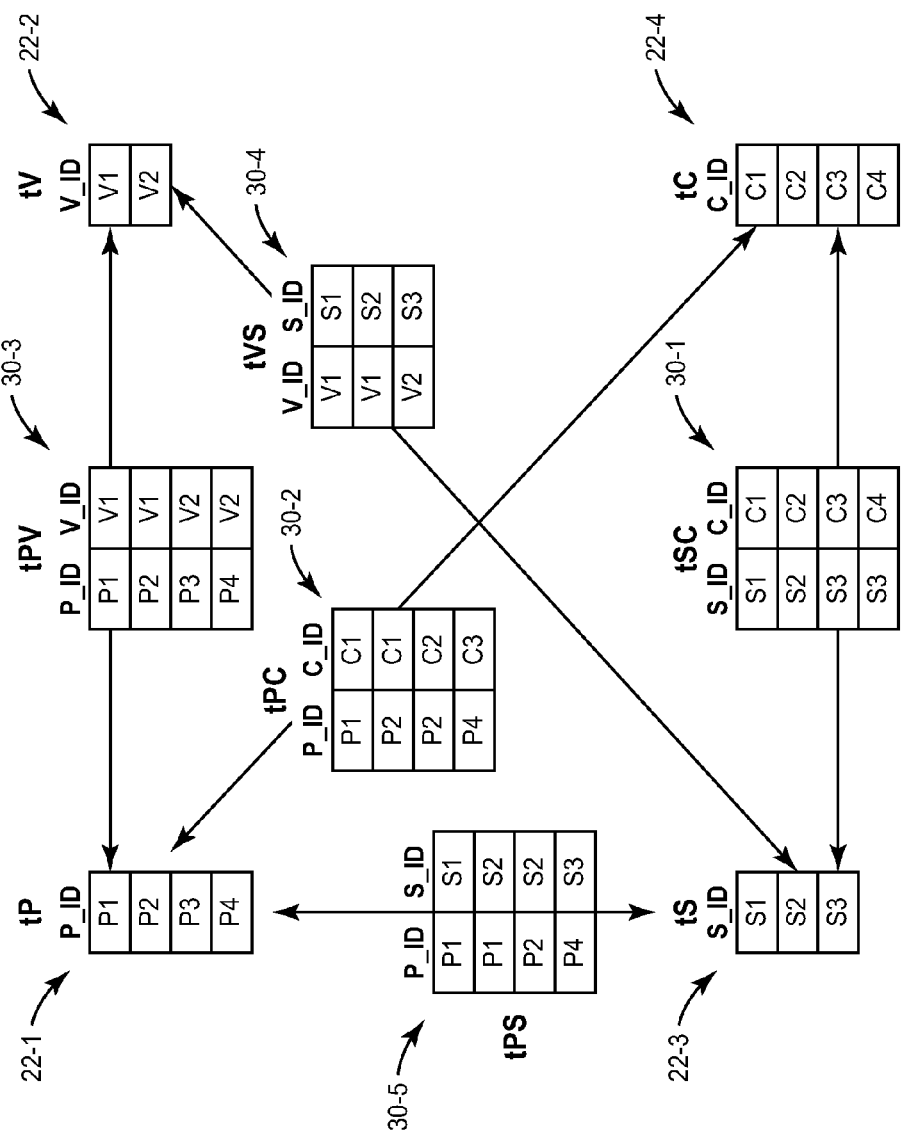
FIG. 6 illustrates how particular entity structures and the entity reference relationship structures illustrated in FIGS. 2 and 3 correspond to the vertices and edges depicted by the graph illustrated in FIG. 5.

FIG. 6 illustrates how particular entity structures 22 and entity reference relationship structures 30 illustrated in FIGS. 2 and 3 correspond to the vertices and edges depicted by the graph 34 illustrated in FIG. 5. For example, the entity structure 22-1 corresponds to the vertex 22-1-V, the entity structure 22-2 corresponds to the vertex 22-2-V, and the entity reference relationship structure 30-3 corresponds to the edge 30-3-E.

Figure 7:
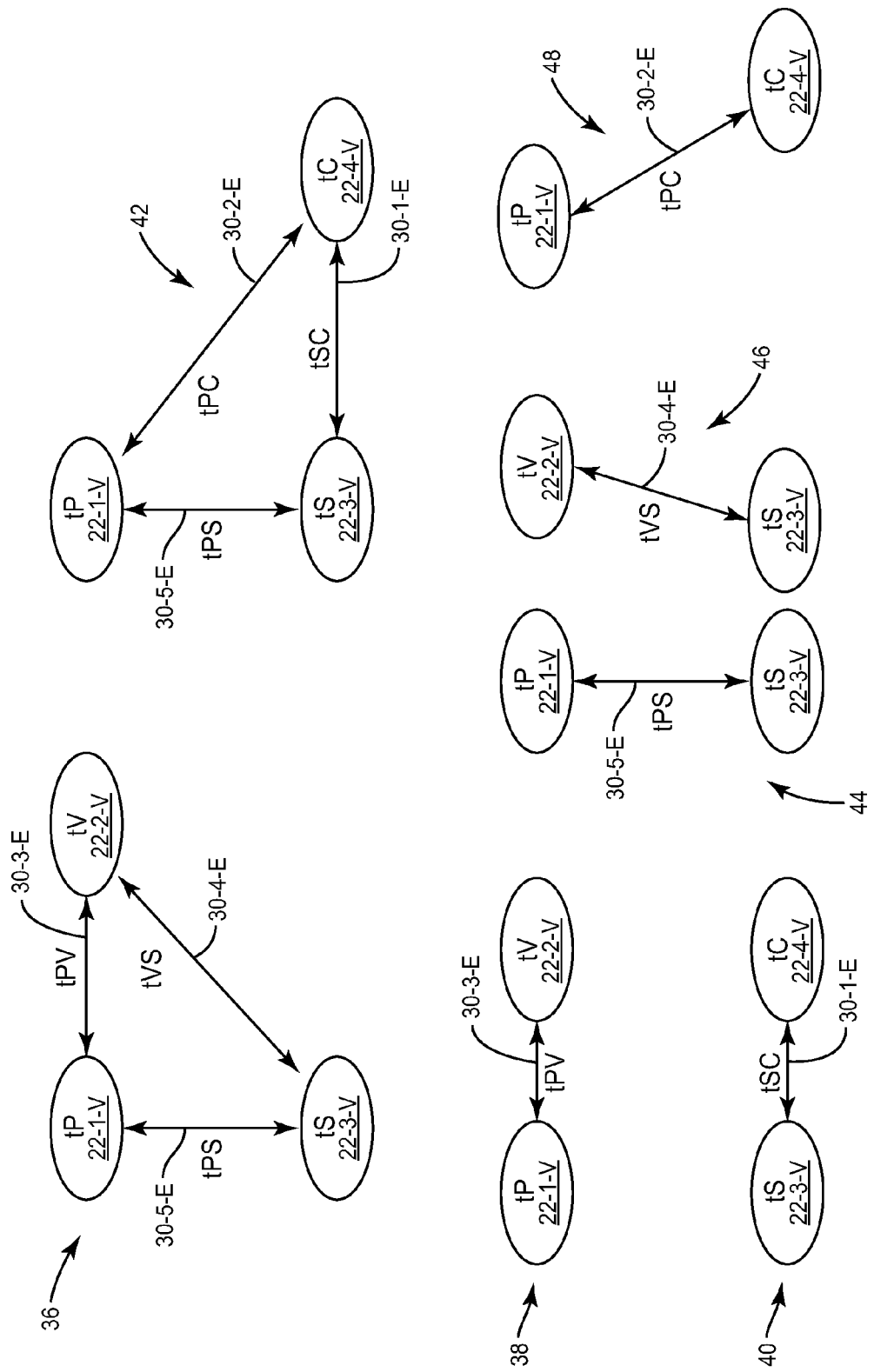
FIG. 7 illustrates the set of seven complete graphs that can be formed from each subset of the entity structures based on the entity reference relationship structures illustrated in FIG. 6.

A complete graph comprises a simple graph in which every pair of distinct vertices is connected by a unique edge. The database relationship analyzer 12 determines each complete graph which can be formed from each subset of the entity structures 22 based on the entity reference relationship structures 30. FIG. 7 illustrates, in graph form, the set of seven complete graphs that can be formed from each subset of the entity structures 22 based on the entity reference relationship structures 30. In particular, a complete graph 36 illustrates the relationships among the entity structures 22-1, 22-2, and 22-3 based on the entity reference relationship structures 30-5, 30-4, and 30-3. A complete graph 38 illustrates the relationship between the entity structures 22-1 and 22-2 based on the entity reference relationship structure 30-3. A complete graph 40 illustrates the relationship between the entity structures 22-3 and 22-4 based on the entity reference relationship structures 30-1. A complete graph 42 illustrates the relationships among the entity structures 22-1, 22-3, and 22-4 based on the entity reference relationship structures 30-1, 30-2, and 30-5. A complete graph 44 illustrates the relationship between the entity structures 22-1 and 22-3 based on the entity reference relationship structure 30-5. A complete graph 46 illustrates the relationship between the entity structures 22-2 and 22-3 based on the entity reference relationship structure 30-4. A complete graph 48 illustrates the relationship between the entity structures 22-1 and 22-4 based on the entity reference relationship structure 30-2.

Figure 8:
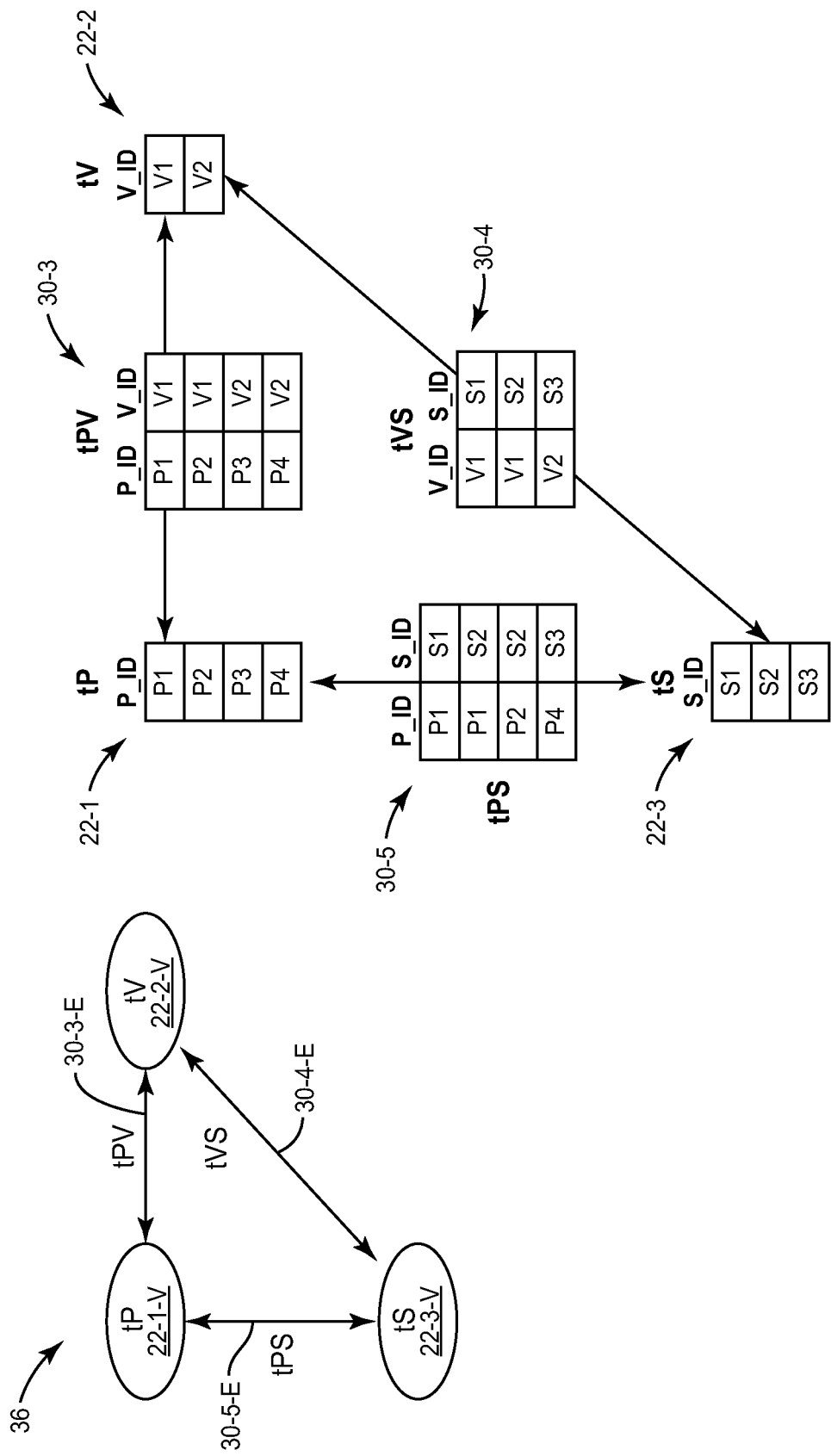
FIG. 8 illustrates how one complete graph illustrated in FIG. 7 corresponds to particular entity structures based on the entity reference relationship structures illustrated in FIG. 6.

FIG. 8 illustrates how the complete graph 36 corresponds to the entity structures 22-1, 22-2, and 22-3 based on the entity reference relationship structures 30-5, 30-4, and 30-3.

FIG. 9 illustrates a structure 50 which may be formed by the database relationship analyzer 12 identifying the entities 20 that correspond to each of the complete graphs 36-48. The structure 50 contains a row corresponding to each determined complete graph 36-48. Each row contains references to the entity structures represented by the corresponding complete graph 36-48. For each of the complete graphs 36-48, the database relationship analyzer 12 accesses the entity reference relationship structures 30 that correspond to the complete graph 36-48, and determines all matched sets of entity instance identifiers, wherein each matched set comprises a row of entity instance identifiers from each entity reference relationship structure 30 corresponding to the respective complete graph 36-48 wherein each entity instance identifier that identifies an entity instance in a particular entity structure 22 is identical to each other entity instance identifier that identifies an entity instance in the particular entity structure 22 (FIG. 4, step 1004).

Figure 10:
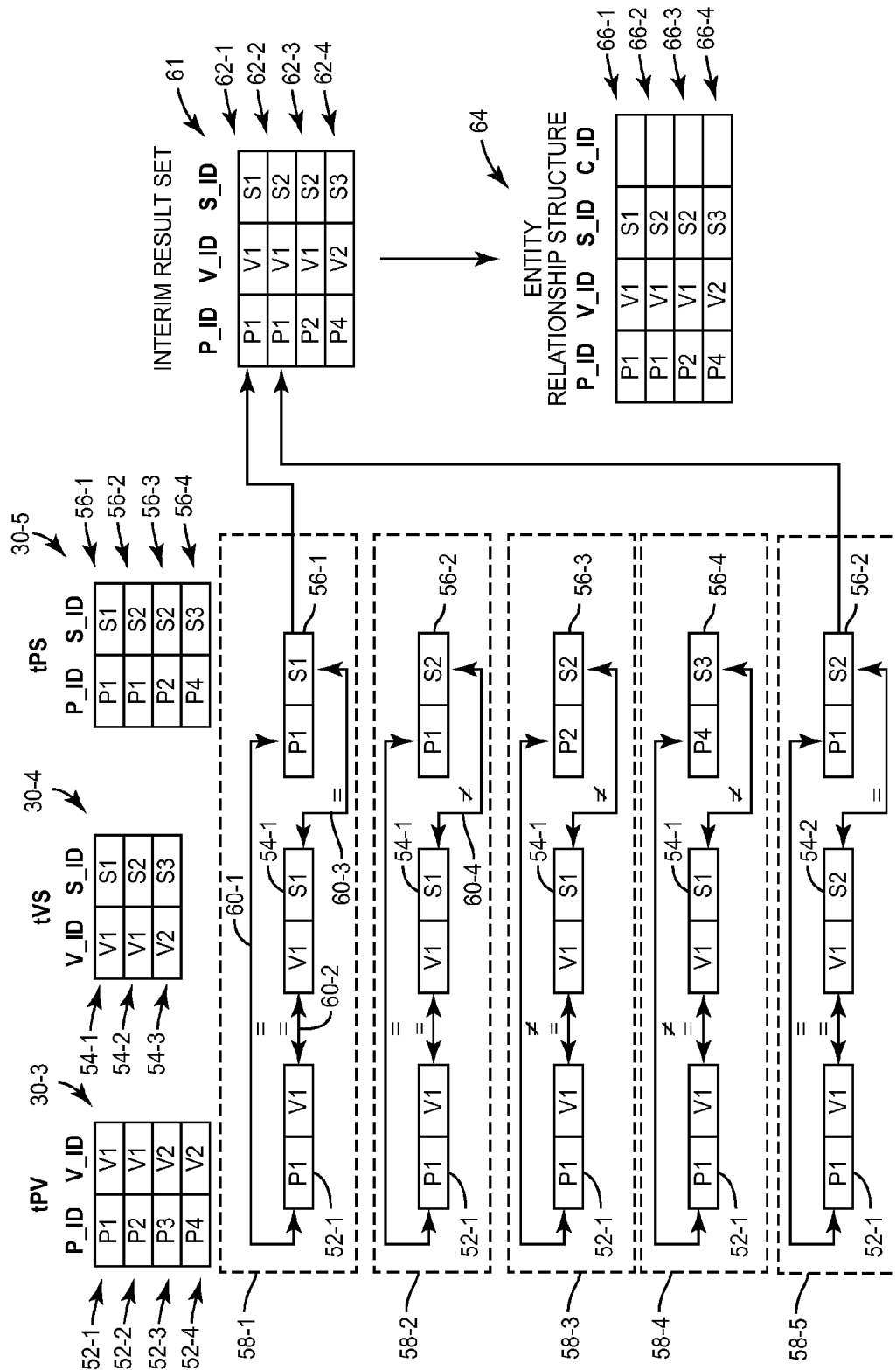
FIG. 10 is a block diagram illustrating the determination of matched sets for the complete graph 36 illustrated in FIG. 7, according to one embodiment.

FIG. 10 is a block diagram illustrating the determination of such matched sets for the complete graph 36 according to one embodiment. As discussed with regard to FIG. 8, the entity reference relationship structures 30-3, 30-4, and 30-5 correspond to the complete graph 36. The entity reference relationship structure 30-3 comprises a plurality of rows 52-1-52-4, each of which contains a pair of entity instance identifiers that identifies a relationship between a particular product entity instance of the product entity structure 22-1 and a particular vendor entity instance of the vendor entity structure 22-2. The entity reference relationship structure 30-4 comprises a plurality of rows 54-1-54-3, each of which contains a pair of entity instance identifiers that identifies a relationship between a particular vendor entity instance of the vendor entity structure 22-2 and a particular store entity instance of the store entity structure 22-3. The entity reference relationship structure 30-5 comprises a plurality of rows 56-1-56-4, each of which contains a pair of entity instance identifiers that identifies a relationship between a particular product entity instance of the product entity structure 22-2 and a particular store entity instance of the store entity structure 22-3.

The database relationship analyzer 12 analyzes each unique set, or combination, of rows, or pairs, of entity instance identifiers from each of the entity reference relationship structures 30-3-30-4. Each set, or combination, comprises a particular row, or pair, of entity instance identifiers from each of the entity reference relationship structures 30-3-30-5. Since, in the example illustrated in FIG. 10, the entity reference relationship structure 30-3 comprises four rows, the entity reference relationship structure 30-4 comprises three rows, and the entity reference relationship structure 30-5 comprises four rows, there are a total of 48 such sets (i.e., 4*3*4). Five sets 58-1-58-5 of the possible 48 sets are illustrated in FIG. 10.

Set 58-1 comprises the pair of entity instance identifiers from the row 52-1 of the entity reference relationship structure 30-3, the pair of entity instance identifiers from the row 54-1 of the entity reference relationship structure 30-4, and the pair of entity instance identifiers from the row 56-1 of the entity reference relationship structure 30-5. Thus, in total, there are six entity instance identifiers in the set 58-1. The database relationship analyzer 12 determines if each entity instance identifier that identifies an entity instance in a particular entity structure 22 is identical to each other entity instance identifier that identifies an entity instance in the particular entity structure 22. For example, with respect to the set 58-1, the entity instance identifier P1 from the row 56-1 identifies a product entity instance 24 of the product entity structure 22-1. The entity instance identifier P1 from the row 52-1 identifies a product entity instance 24 of the product entity structure 22-1. The entity instance identifier P1 from the row 52-1 is identical to the entity instance identifier P1 from the row 56-1, as denoted by the "=" sign depicted next to line 60-1, and thus they refer to the same entity instance. The entity instance identifier V1 from the row 52-1 identifies a vendor entity instance of the vendor entity structure 22-2. The entity instance identifier V1 from the row 54-1 identifies a vendor entity instance of the product entity structure 22-1. The entity instance identifier V1 from the row 52-1 is identical to the entity instance identifier V1 from the row 54-1, as denoted by the "=" sign depicted next to line 60-2, and thus they refer to the same entity instance. The entity instance identifier S1 from the row 54-1 identifies a store entity instance of the store entity structure 22-3. The entity instance identifier S1 from the row 56-1 identifies a store entity instance of the store entity structure 22-3. The entity instance identifier S1 from the row 54-1 is identical to the entity instance identifier S1 from the row 56-1, as denoted by the "=" sign depicted next to line 60-3. Consequently, each entity instance identifier that identifies an entity instance in a particular entity structure 22 is identical to each other entity instance identifier that identifies an entity instance in the particular entity structure 22, and the database relationship analyzer 12 therefore determines that the set of rows 52-1, 54-1, and 56-1 constitute a matched set.

In one embodiment, the database relationship analyzer 12 stores the entity instance identifiers from a matched set in association with each other in an interim result set 61 (FIG. 4, step 1006). Preferably, duplicate entity instance identifiers are removed, so only one copy of each entity instance identifier in the matched set is stored in the interim result set 61. The phrase "in association with one another" means that the entity instance identifiers are stored with respect to each other such that it can be determined that the entity instance identifiers are related to one another. In the interim result set 61, the entity instance identifiers from the set 58-1 are stored in association with one another as a row 62-1.

The set 58-2 is an example of a set, or combination, of rows, or pairs, of entity instance identifiers from each of the entity reference relationship structures 30-3-30-5 that does not constitute a matched set. In particular, the store entity instance identifier S1 from the row 54-1 is not identical to the store entity instance identifier S2 from the row 56-2 in the set, as denoted by the "not equal" symbol near line 60-4, and thus they refer to different entity instances in the same entity structure 22. Consequently, the set 58-2 comprising rows 52-1, 54-1, and 56-2 does not constitute a matched set, and the entity instance identifiers are not stored in association with one another in the interim result set 61. Similarly, neither of sets 58-3 or 58-4 constitutes a matched set. The set 58-5 is an example of a matched set, and thus the entity instance identifiers are stored in association with one another as the row 62-2 in the interim result set 61. This determination is made for each of the 48 sets, ultimately resulting in four matched sets, as illustrated by the rows 62-1-62-4 of the interim result set 61.

The database relationship analyzer 12 generates, initially, an empty entity relationship structure 64 comprising a column for each entity structure 22 being analyzed. As the database relationship analyzer 12 processes each complete graph, interim result sets suitable for storing the entity instance identifiers of matched sets, such as the interim result set 61, may be generated. After all matched sets for a respective complete graph have been determined and the entity instance identifiers stored in the respective interim result set 61, the database relationship analyzer 12 determines whether the entity instance relationships identified in each row of the interim result set 61 are already reflected in the entity relationship structure 64. If the relationships are not reflected, then the entity instance identifiers stored in association with one another in the interim result set 61 are stored in association with one another in the entity relationship structure 64 (FIG. 4, step 1008). For example, because the relationships among entity instance identifiers reflected by rows 62-1-62-4 of the interim result set 61 are not initially identified in the entity relationship structure 64, corresponding rows 66-1-66-4 are generated and stored in the entity relationship structure 64 to identify such relationships.

The use of an interim result set, such as the interim result set 61, is optional, and the database relationship analyzer 12 may, as it identifies matched sets of entity instance identifiers, merely add such relationships to the entity relationship structure 64 if such relationships are not already identified in the entity relationship structure 64.

Figure 11:
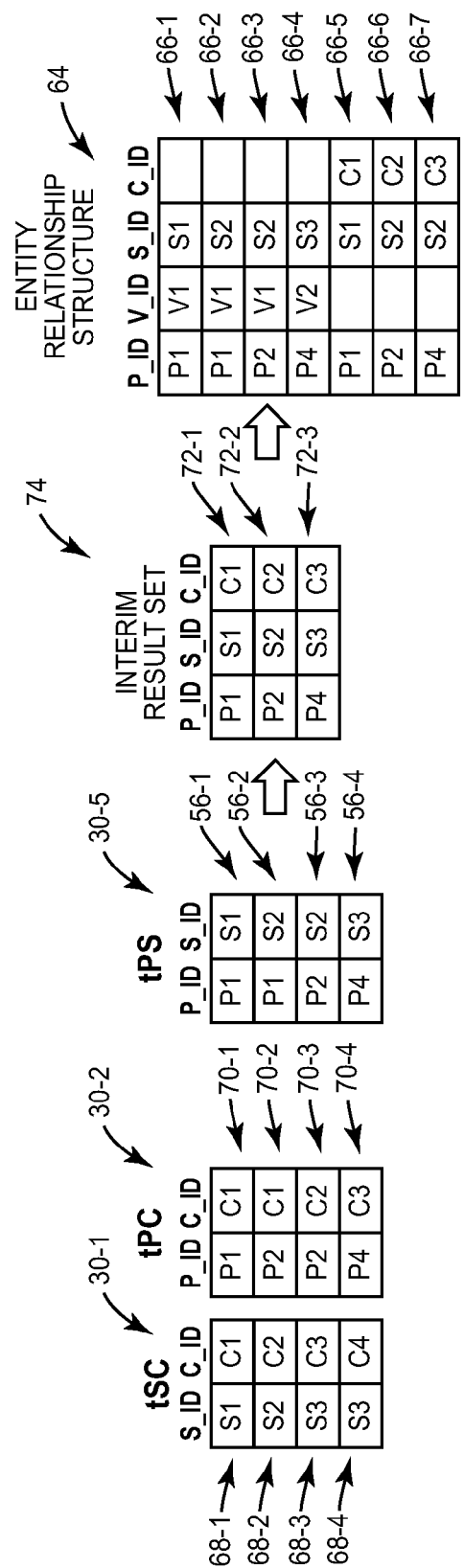
FIG. 11 is a block diagram illustrating the determination of matched sets for the complete graph 42 illustrated in FIG. 7, according to one embodiment.

FIG. 11 is a block diagram illustrating the determination of matched sets for the complete graph 42 (FIG. 7) according to one embodiment. As discussed with regard to FIG. 7, the entity reference relationship structures 30-1, 30-2, and 30-5 correspond to the complete graph 42. The entity reference relationship structure 30-1 comprises a plurality of rows 68-1-68-4, each of which contains a pair of entity instance identifiers that identifies a relationship between a particular store entity instance of the store entity structure 22-3 and a particular customer entity instance of the customer entity structure 22-4. The entity reference relationship structure 30-2 comprises a plurality of rows 70-1-70-4, each of which contains a pair of entity instance identifiers that identifies a relationship between a particular product entity instance of the product entity structure 22-1 and a particular customer entity instance of the customer entity structure 22-4. As discussed above, the entity reference relationship structure 30-5 comprises a plurality of rows 56-1-56-4, each of which contains a pair of entity instance identifiers that identifies a relationship between a particular product entity instance of the product entity structure 22-1 and a particular store entity instance of the store entity structure 22-3.

Because each of the entity reference relationship structures 30-1, 30-2, 30-5 contains four rows, there are a total of 64 different sets, or combinations, of rows of entity instance identifiers comprising one row from each of the entity reference relationship structures 30-1, 30-2, 30-5 (i.e., 4*4*4). The database relationship analyzer 12 processes each of the 64 sets, similarly to the process discussed with respect to FIG. 10, and determines that there are three matched sets, or combinations, of pairs of entity instance identifiers wherein each entity instance identifier that identifies an entity instance in a particular entity structure is identical to each other entity instance identifier that identifies an entity instance in the particular entity structure. The entity instance identifiers in each of the three matched sets are stored in association with one another as rows 72-1-72-3 of an interim result set 74. The database relationship analyzer 12 determines that none of the relationships identified in the interim result set 74 is identified in the entity relationship structure 64, and thus stores the relationships identified in the rows 72-1-72-3 as rows 66-5-66-7 in the entity relationship structure 64.

Figure 12:
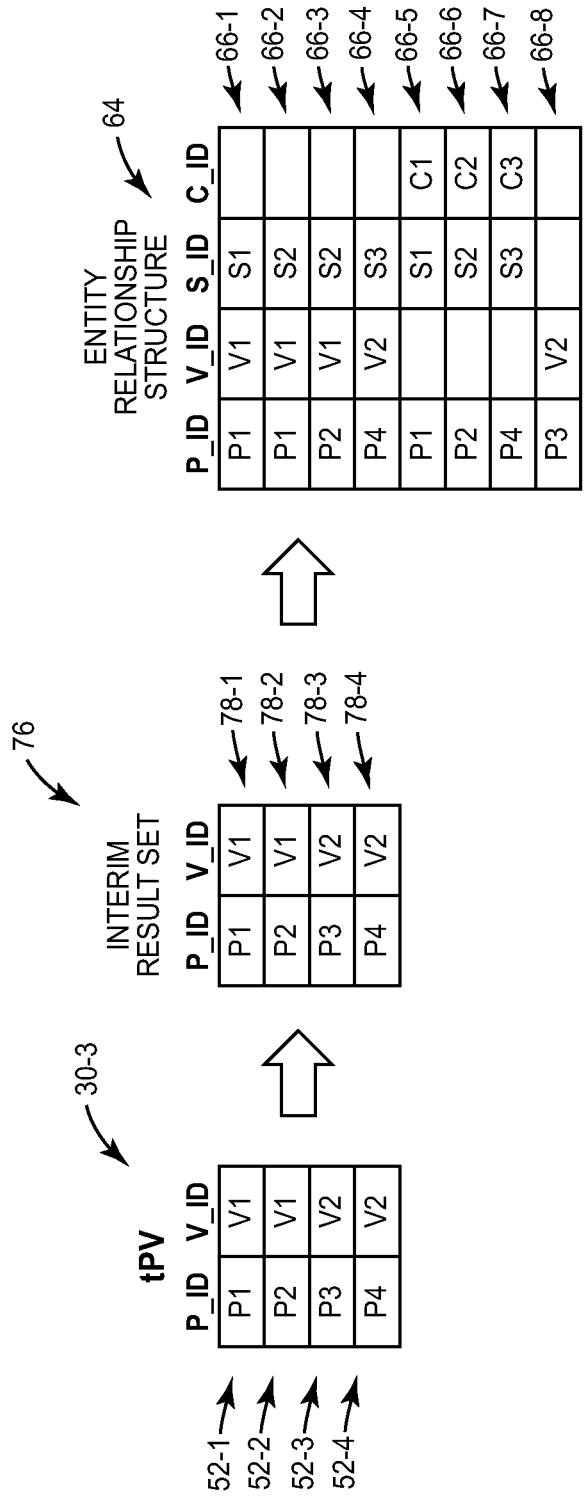
FIG. 12 is a block diagram illustrating the determination of matched sets for the complete graph 38 illustrated in FIG. 7, according to one embodiment.

FIG. 12 is a block diagram illustrating the determination of matched sets for the complete graph 38 according to one embodiment. As discussed with regard to FIG. 7, the entity reference relationship structure 30-3 corresponds to the complete graph 38. Where only a single entity reference relationship structure 30 is associated with a complete graph, each row in the respective entity reference relationship structure comprises a matched set, because each entity instance identifier that identifies an entity instance in a particular entity structure 22 is identical to each other entity instance identifier that identifies an entity instance in the particular entity structure 22. Thus, the entity instance identifiers in each of the rows 52-1-52-4 constitutes a matched set and is stored in an interim result set 76 as rows 78-1-78-4. The database relationship analyzer 12 determines whether the relationships identified by the entity instance identifiers in the interim result set 76 are already identified in the entity relationship structure 64.

The database relationship analyzer 12 determines that the relationship identified in row 78-1 (i.e., that the entity instance identifier P1 is related to the entity instance identifier V1) is already reflected in row 66-1 of the entity relationship structure 64. The database relationship analyzer 12 determines that the relationship identified in row 78-2 (i.e., that the entity instance identifier P2 is related to the entity instance identifier V1) is already reflected in row 66-3 of the entity relationship structure 64. The database relationship analyzer 12 determines that the relationship identified in row 78-3 (i.e., that the entity instance identifier P3 is related to the entity instance identifier V2) is not reflected in the entity relationship structure 64, and thus stores the entity instance identifier P3 in association with the entity instance identifier V2 as a row 66-8 the entity relationship structure 64. The database relationship analyzer 12 determines that the relationship identified in row 78-4 (i.e., that the entity instance identifier P4 is related to the entity instance identifier V2) is already reflected in row 66-4 of the entity relationship structure 64.

Figure 13:
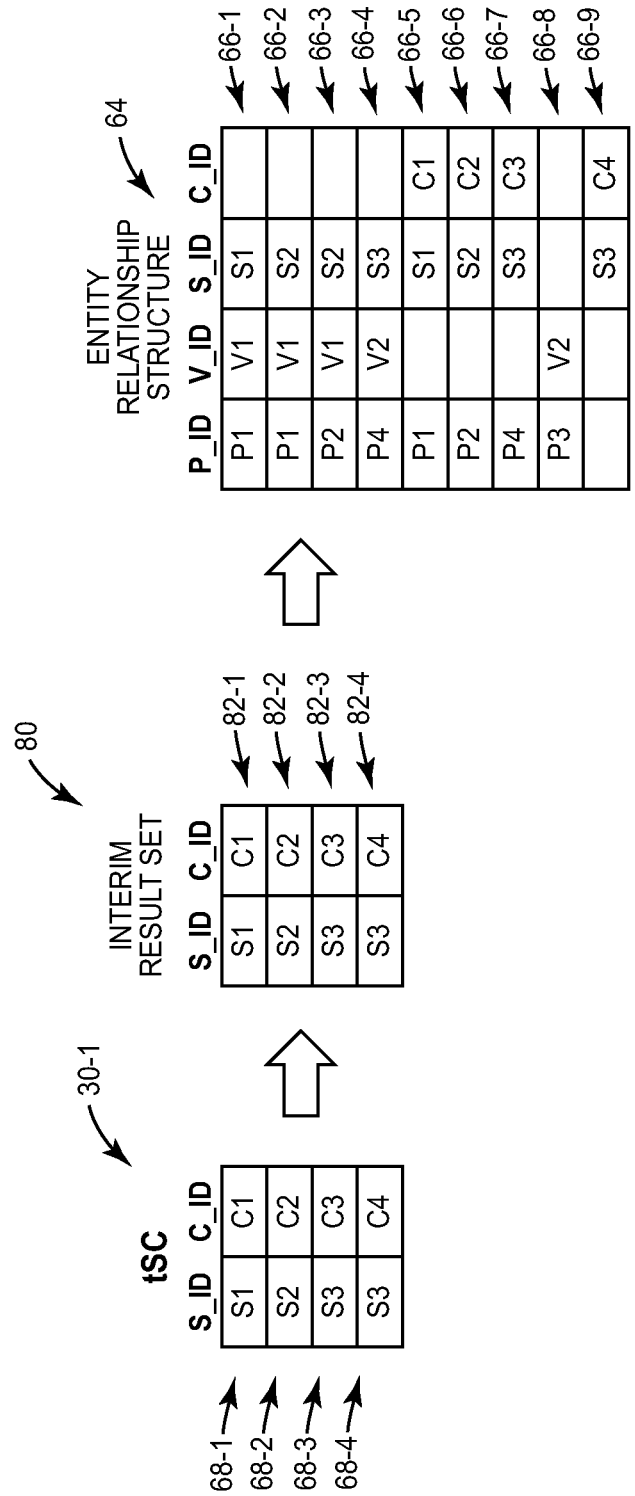
FIGS. 13-16 are block diagrams illustrating the determination of matched sets for the complete graphs 40, 44, 46 and 48 illustrated in FIG. 7, according to one embodiment.
Figure 14:
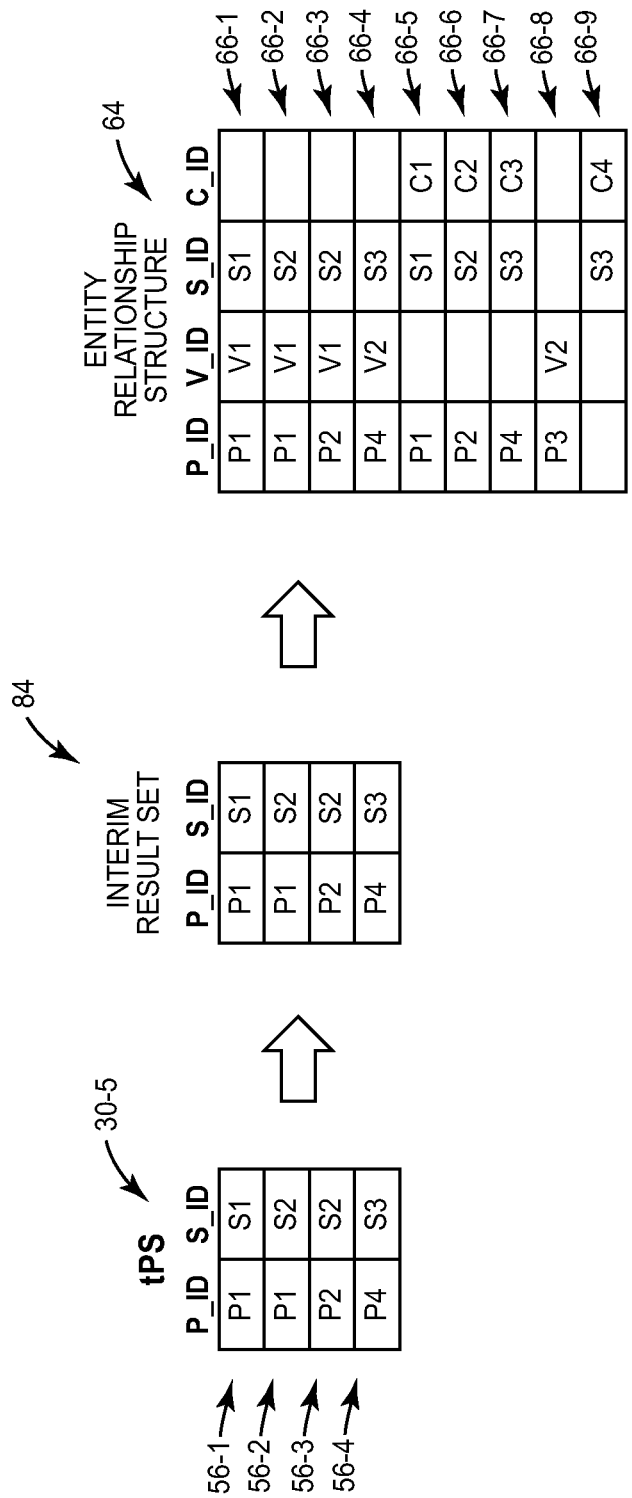
Figure 15:
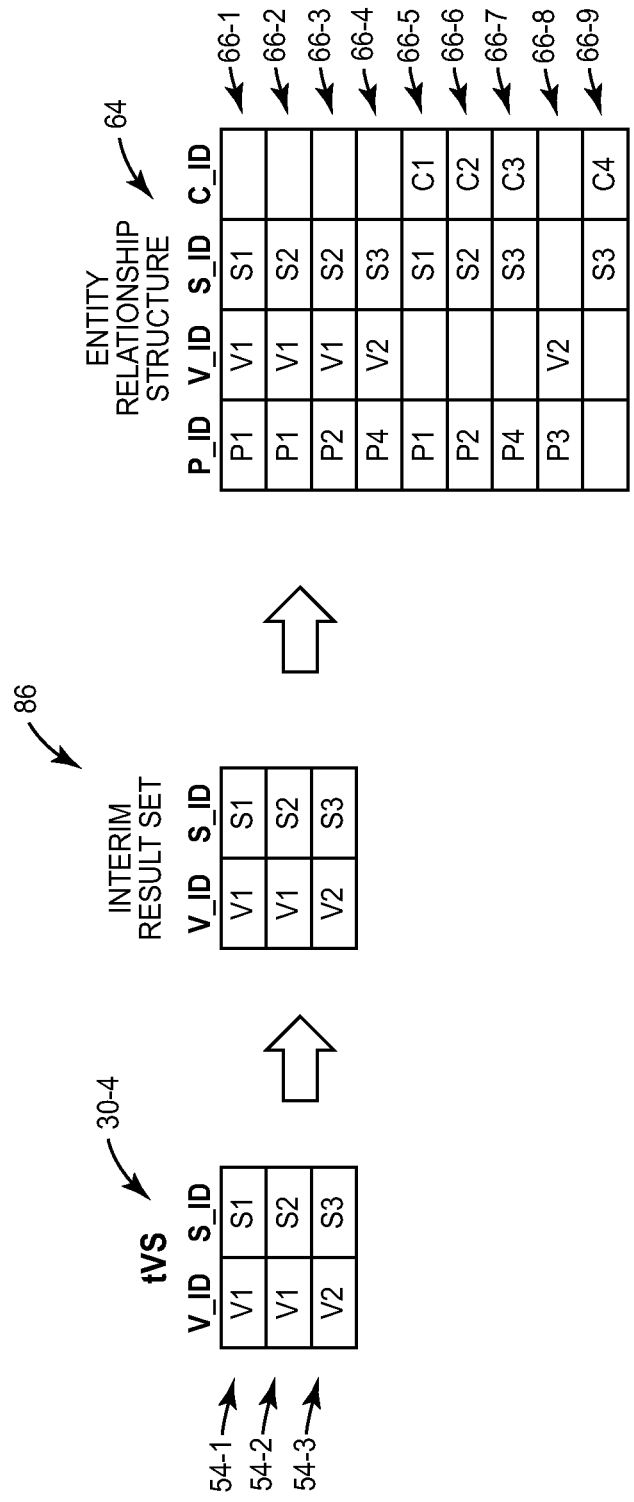
Figure 16:
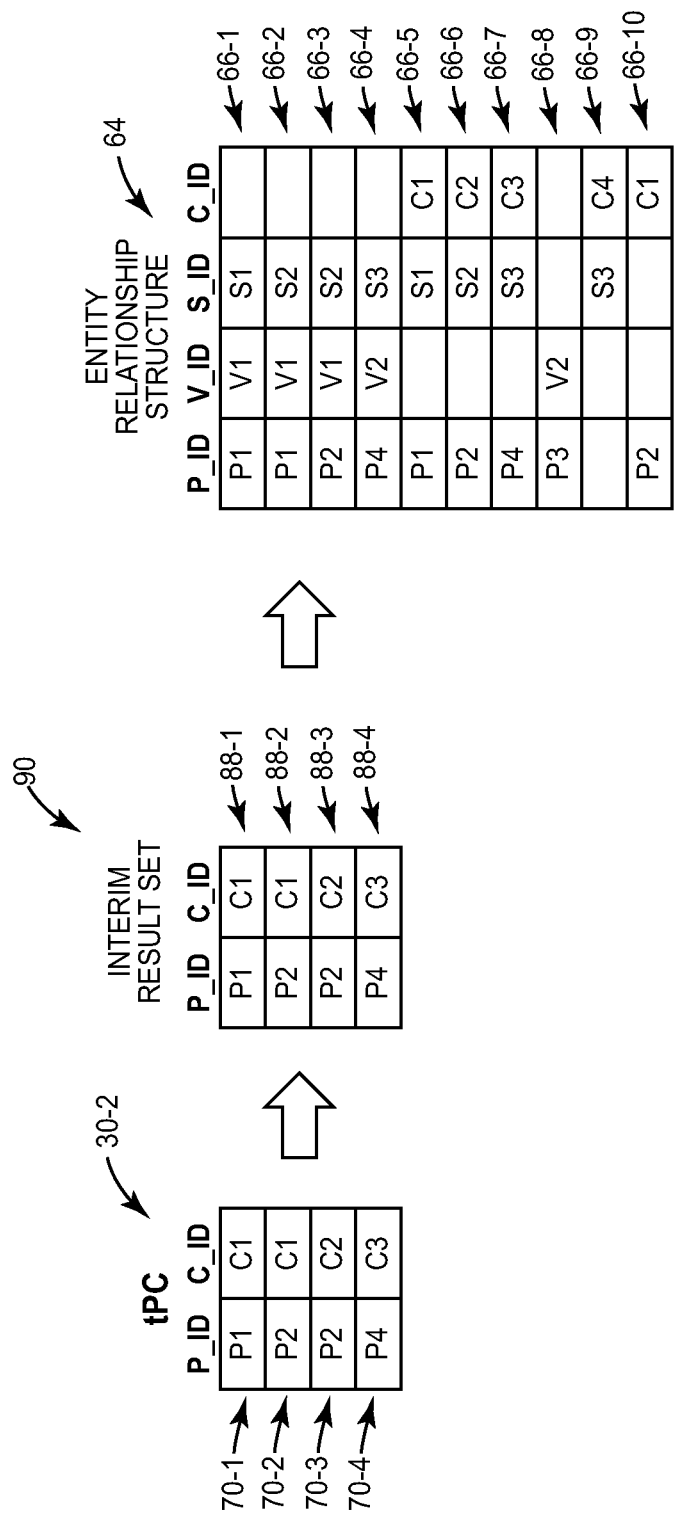

FIGS. 13-16 are block diagrams illustrating the determination of matched sets for the complete graphs 40, 44, 46, and 48. Referring to FIG. 13, the database relationship analyzer 12 determines that the relationship among entity instance identifiers identified in row 82-4 of an interim result set 80 is not reflected in the entity relationship structure 64, and adds the relationship to the entity relationship structure 64 as row 66-9. Referring to FIGS. 14 and 15, the database relationship analyzer 12 determines that each of the relationships among entity instance identifiers identified in interim result sets 84 and 86 are already reflected in the entity relationship structure 64, and therefore no new rows are added to the entity relationship structure 64. Referring to FIG. 16, the database relationship analyzer 12 determines that the relationships among entity instance identifiers identified in row 88-2 of an interim result set 90 is not reflected in the entity relationship structure 64, and adds the relationship to the entity relationship structure 64 as row 66-10.

After processing the entity reference relationship structures 30 associated with each of the complete graphs 36-48, the entity relationship structure 64 identifies each relationship among all entity instances of the entity structures 22-1-22-4.

Sometimes the relationship between entity instances in one entity structure 22 and entity instances in another entity structure 22 is necessarily one-to-one. Assume, for example, a company database contains an employee entity structure for maintaining information about employees, an office entity structure for maintaining information about offices, and a desk entity structure for maintaining information about desks. The company may require that each office has only a single desk, and, obviously any desk can only be in one office. The company may similarly require that an employee may have only a single office, and that each office may only be associated with one employee. Thus, the employee entity structure would have a one-to-one relationship with the office entity structure, and the office entity structure would have a one-to-one relationship with the desk entity structure. Groups of entity structures 22 so related may be referred to herein as one-to-one ("1:1") entity structure groups.

Some of the relationships between entity instances of two entity structures in a 1:1 entity structure group may be identified in the database, and others may not. For example, in the company database example above, an employee-office entity reference relationship structure might identify for each particular employee entity instance in the employee entity structure the particular office entity instance in the office entity structure with which the particular employee entity instance is related. Further, an office-desk entity reference relationship structure might identify for each particular office entity instance in the office entity structure the particular desk entity instance in the desk entity structure with which the particular office entity instance is related. However, it may be desirable to have an employee-desk entity reference relationship structure that identifies the relationships between employee entity instances and desk entity instances. Generating such an employee-desk relationship reference structure would typically require human knowledge about the relationships between employees and offices, and offices and desks, and further require special software development skills necessary to develop a program to generate such a structure.

In one embodiment, the database relationship analyzer 12 operates to generate an entity reference relationship structure that identifies relationships between the entity instances of a first entity structure in a 1:1 entity structure group and a second entity structure in the 1:1 entity structure group. The entity reference relationship structure may then be utilized in the process discussed above with regard to FIGS. 1-16 to generate an entity relationship structure 64 that identifies the relationships among entity instances in a database.

Figure 17:
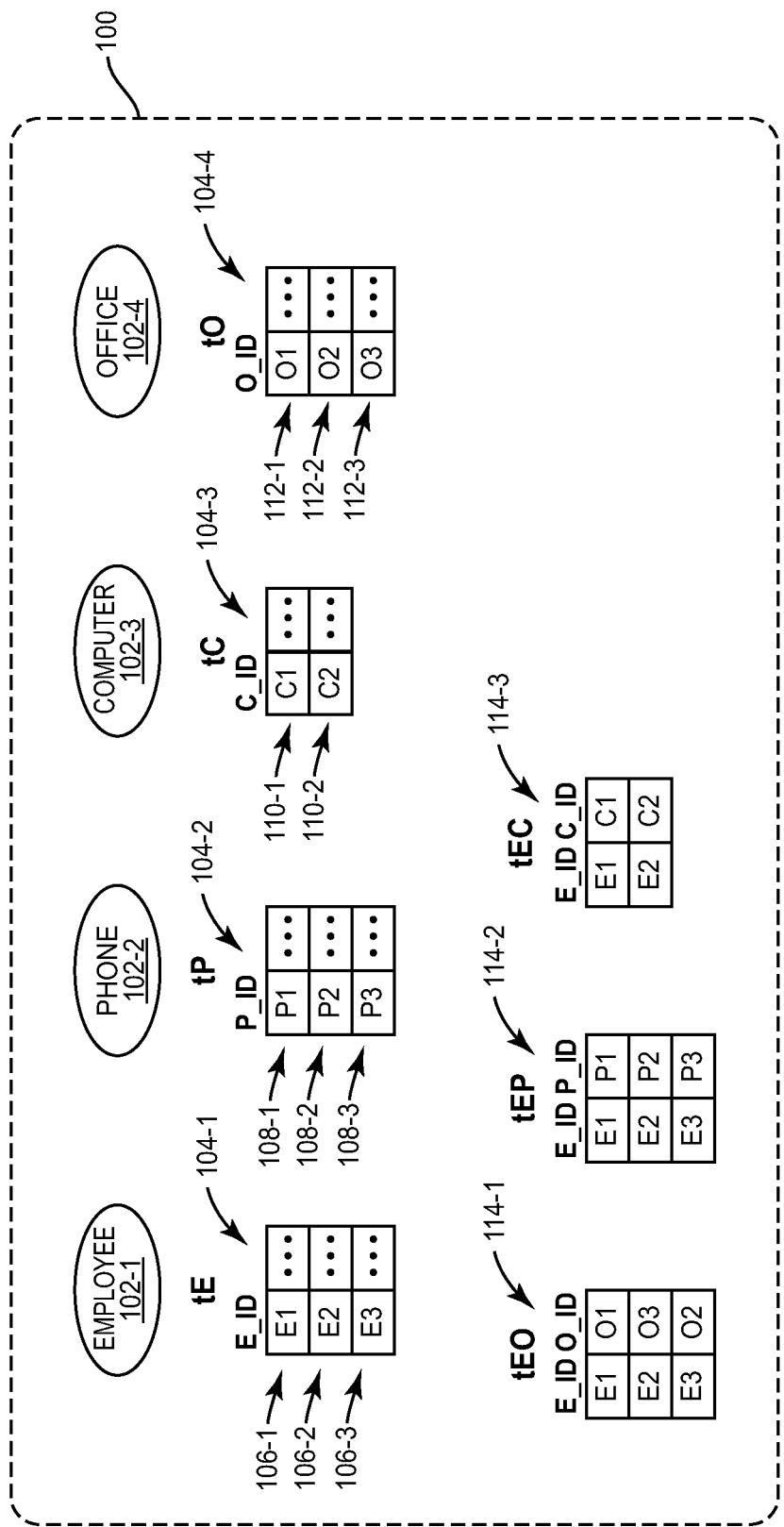
FIG. 17 is a block diagram of an exemplary database which models a plurality of entities, according to one embodiment.

FIG. 17 is a block diagram of an exemplary database 100 which models a plurality of entities 102-1-102-4 (generally, entities 102). The entity 102-1 models employees of the company, and is implemented in an employee entity structure 104-1 having an entity structure name "tE." A unique identifier, "E_ID," uniquely identifies each employee entity instance of a plurality of employee entity instances 106-1-106-3 (generally, employee entity instances 106). Ellipses, as discussed above, represent zero or more additional data attributes of an entity instance, which, for purposes of brevity and clarity, are not illustrated herein. The entity 102-2 models phones of the company, and is implemented in a phone entity structure 104-2 having an entity structure name "tP." A unique identifier, "P_ID," uniquely identifies each phone entity instance of a plurality of phone entity instances 108-1-108-3 (generally, phone entity instances 108). The entity 102-3 models computers of the company, and is implemented in a computer entity structure 104-3 having an entity structure name "tC." A unique identifier, "C_ID," uniquely identifies each computer entity instance of a plurality of computer entity instances 110-1-110-2 (generally, computer entity instances 110). The entity 102-4 models offices of the company, and is implemented in an office entity structure 104-4 having an entity structure name "tO." A unique identifier, "O_ID," uniquely identifies each office entity instance of a plurality of office entity instances 112-1-112-3 (generally, office entity instances 112).

Each of the entity structures 104 has one-to-one relationships with other entity structures 104, and thus the entity structures 104 collectively form a 1:1 entity structure group. The database 100 also contains a plurality of entity reference relationship structures 114-1-114-5, each of which identifies the relationships between entity instances of a pair of entity structures 104. In particular, the entity reference relationship structure 114-1 identifies the relationships between employee entity instances 106 of the employee entity structure 104-1 and office entity instances 112 of the office entity structure 104-4; the entity reference relationship structure 114-2 identifies the relationships between employee entity instances 106 of the employee entity structure 104-1 and phone entity instances 108 of the phone entity structure 104-2; and the entity reference relationship structure 114-3 identifies the relationships between employee entity instances 106 of the employee entity structure 104-1 and computer entity instance 110 of the computer entity structure 104-3.

Figure 18:
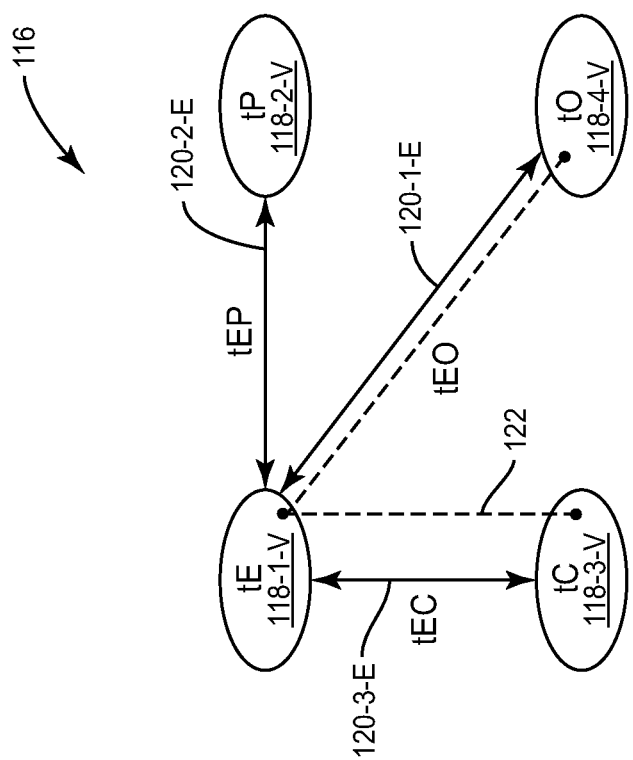
FIG. 18 is a graph that identifies the known relationships among the entity structures based on the entity reference relationship structures illustrated in FIG. 17.

FIG. 18 illustrates a graph 116 that identifies the known relationships among the entity structures 104 (FIG. 17) based on the entity reference relationship structures 114 (FIG. 17). The graph 116 includes a plurality of vertexes 118-1-V, 118-2-V, 118-3-V, and 118-4-V (generally, vertices 118), which correspond, respectively, to the entity structures 104-1, 104-2, 104-3, and 104-4 (FIG. 17). The graph 116 also includes a plurality of edges 120-1-E, 120-2-E, and 120-3-E (generally, edges 120), which correspond, respectively, to entity reference relationship structures 114-1, 114-2, and 114-3 (FIG. 17). As will be discussed in greater detail herein, paths among the entity structures 104 may determined based on the entity reference relationship structures 114. For example, a path 122 between the vertex 118-3-V and the vertex 118-4-V may be determined that begins at the vertex 118-3-V, travels, or extends, through an intermediate vertex 118-1-V, and ends at the vertex 118-4-V. Each path comprises at least two edges 120, each of which corresponds to an entity reference relationship structure 114. For example, the path discussed above includes an edge 120-3-E, which corresponds to the entity reference relationship structure 114-3, and an edge 120-1-E, which corresponds to the entity reference relationship structure 114-1.

Figure 19:
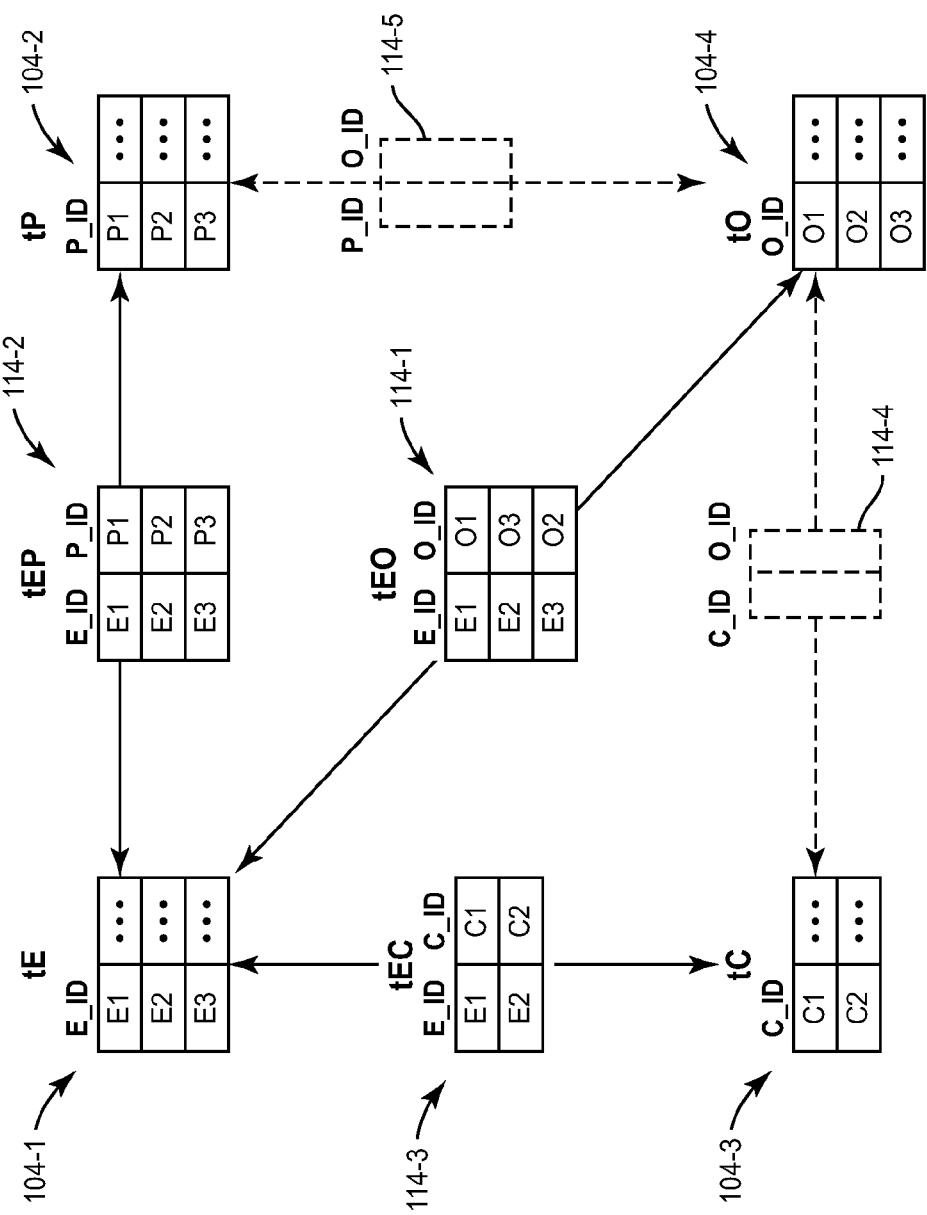
FIG. 19 is a block diagram illustrating how particular entity structures and entity reference relationship structures illustrated in FIG. 17 correspond to the vertices and edges depicted by the graph 34 illustrated in FIG. 18.

FIG. 19 is a block diagram illustrating how particular entity structures 104 and entity reference relationship structures 114 illustrated in FIG. 17 correspond to the vertices 118 and edges 120 depicted by the graph 116 illustrated in FIG. 18. Assume that it is desired that new entity reference relationship structures 114-4 and 114-5, depicted in dashed outline in FIG. 19, be generated. In particular, it is desired that the entity reference relationship structure 114-4 contain pairs of entity instance identifiers that identify the relationships between computer entity instances 110 of the computer entity structure 104-3 and office entity instances 112 of the office entity structure 104-4, and that entity reference relationship structure 114-5 contain pairs of entity instance identifiers that identify the relationships between phone entity instances 108 of the phone entity structure 104-2 and office entity instances 112 of the office entity structure 104-4.

Figure 20:
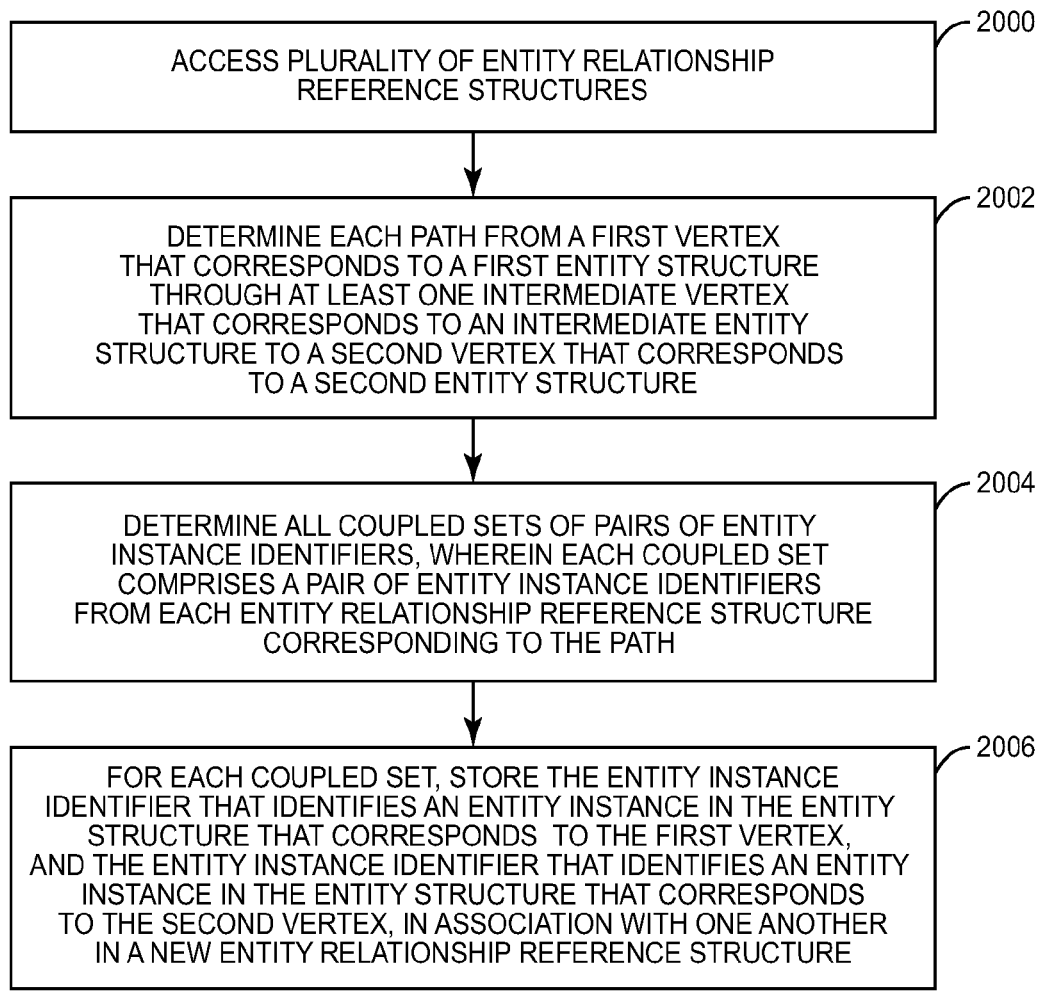
FIG. 20 is a flowchart that illustrates an exemplary process for generating a new entity reference relationship structure in a 1:1 entity structure group according to one embodiment.

FIG. 20 is a flowchart that illustrates an exemplary process for generating a new entity reference relationship structure in a 1:1 entity structure group according to one embodiment. FIG. 20 will be discussed in conjunction with FIGS. 18-22. Initially, the database relationship analyzer 12 accesses the known plurality of entity reference relationship structures 114-1-114-3 (FIG. 20, step 2000). The database relationship analyzer 12 (FIG. 1) determines, for each entity reference relationship structure 114, the pair of entity structures 104 between which the respective entity reference relationship structure 114 establishes a relationship. This may be determined, for example, based on the unique entity instance identifiers contained in the respective entity reference relationship structure 114, or may be supplemental information obtained by the database relationship analyzer 12. For example, the database relationship analyzer 12 may access configuration information that indicates, for example, that the entity reference relationship structure 114-1 establishes a relationship between the employee entity structure 104-1 and the office entity structure 104-4.

Assume that the database relationship analyzer 12 will generate the entity reference relationship structure 114-4 first. Referring again to FIG. 18, the database relationship analyzer 12 identifies, or determines, each unique path that extends, or travels, from the vertex 118-3-V, which corresponds to the computer entity structure 104-3, to the vertex 118-4-V, which corresponds to the office entity structure 104-4, based on the edges 120, each of which corresponds to a respective entity reference relationship structure 114, as discussed above (FIG. 20, step 2002). This may also be referred to as determining each unique path from a designated first entity structure (e.g., in this example, the computer entity structure 104-3) to a designated second entity structure (e.g., in this example, the office entity structure 104-4) through the entity structures in the one-to-one entity structure group based on the plurality of entity reference relationship structures.

In this example, a single path 122 is determined, which comprises the vertex 118-3-V (which may be referred to as the "first" vertex because it is the beginning of the path 122), the edge 120-3-E, the vertex 118-1-V (which may be referred to as an "intermediate" vertex because it is between the first vertex 118-3-V and the vertex 118-4-V), the edge 120-1-E, and the vertex 118-4-V (which may be referred to as the "second" vertex because it is the end of the path 122).

Figure 21:
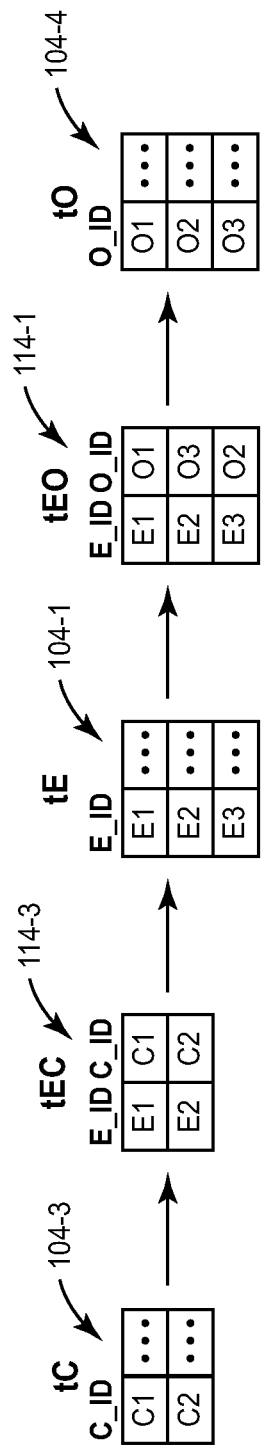
FIG. 21 is a block diagram illustrating the correspondence of the vertices and edges in the path 122 illustrated in FIG. 18 with the entity structures and the entity reference relationship structures illustrated in FIG. 19.

FIG. 21 illustrates the correspondence of the vertices 118 and the edges 120 in the path 122 with the entity structures 104 and the entity reference relationship structures 114. For each determined path, and in this example there is only the single determined path 122, the database relationship analyzer 12 determines, or identifies, all coupled sets of pairs of entity instance identifiers, wherein each coupled set comprises a pair of entity instance identifiers from each entity reference relationship structure corresponding to the path 122 (FIG. 20, step 2004).

Figure 22:
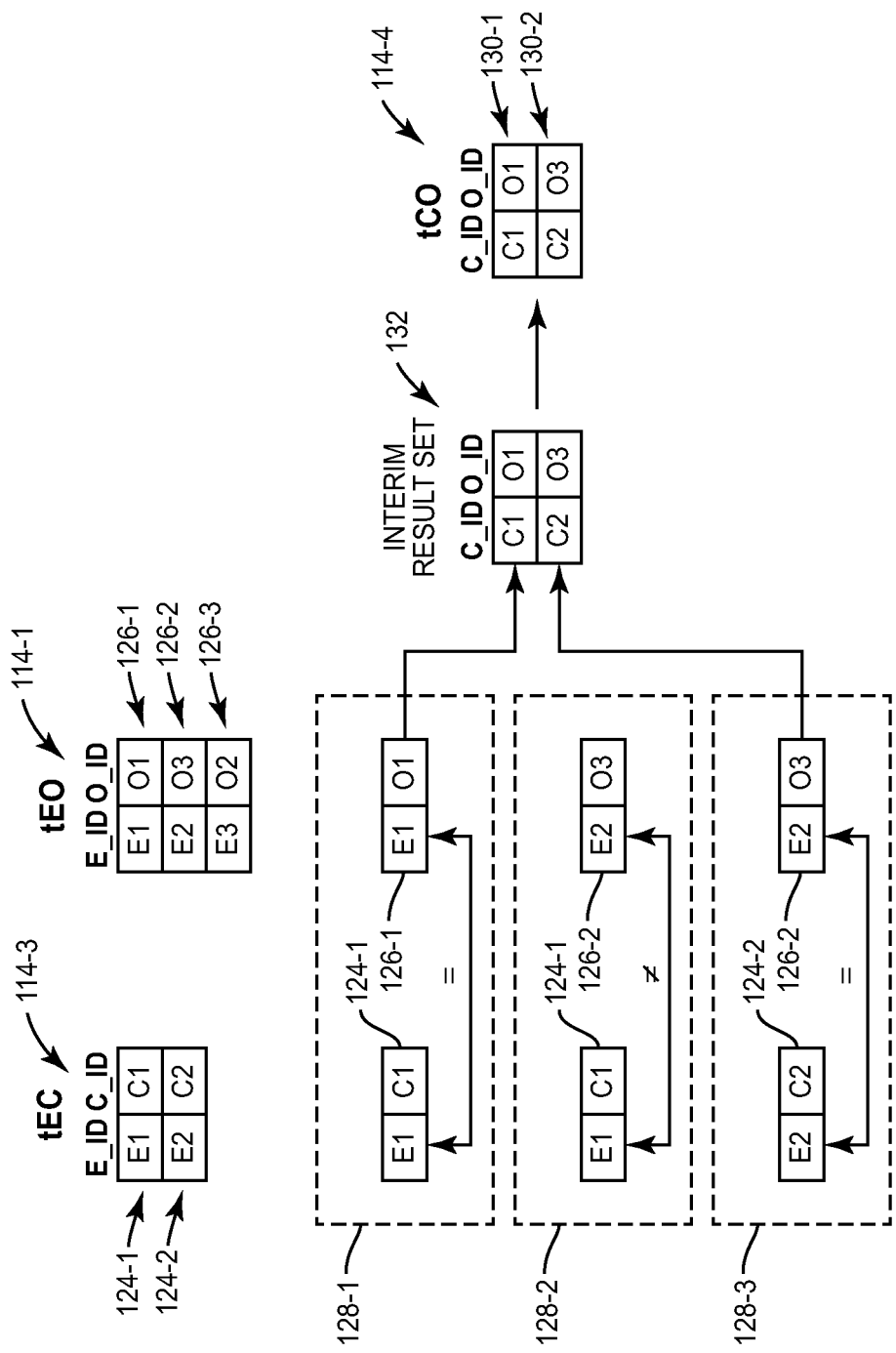
FIG. 22 is a block diagram illustrating the determination of coupled sets for the path 122 according to one embodiment.

FIG. 22 is a block diagram illustrating the determination of coupled sets for the path 122 according to one embodiment. The entity reference relationship structure 114-3 contains a plurality of pairs of entity instance identifiers, referred to as rows 124-1-124-2, each of which identifies a relationship between an employee entity instance 106 of the employee entity structure 104-1 and a computer entity instance 110 of the computer entity structure 104-3. The entity reference relationship structure 114-1 contains a plurality of pairs of entity instance identifiers, referred to as rows 126-1-126-3, each of which identifies a relationship between an employee entity instance 106 of the employee entity structure 104-1 and an office entity instance 112 of the office entity structure 104-4.

Generally, a coupled set comprises one pair of entity instance identifiers from each entity reference relationship structure 114 that corresponds to the path being analyzed, wherein at least one entity instance identifier from each pair of entity instance identifiers in the coupled set matches an entity instance identifier from another pair of entity instance identifiers in the coupled set. In particular, with respect to the path 122, the entity reference relationship structure 114-3 contains two pairs of entity instance identifiers (i.e., rows 124-1 and 124-2), and the entity reference relationship structure 114-1 contains three pairs of entity instance identifiers (i.e., rows 126-1-126-3). Accordingly, there are six (i.e., 2*3) possible sets that comprise a combination of one pair of entity instance identifiers from each of the entity reference relationship structure 114-3 and the entity reference relationship structure 114-1.

For purposes of illustration, FIG. 22 shows three sets 128-1-128-3 of the possible six sets of pairs of entity instance identifiers. The set 128-1 comprises the row 124-1 from the entity reference relationship structure 114-3 and the row 126-1 from the entity reference relationship structure 114-1. Note that the entity instance identifier E1 in the row 124-1 matches the entity instance identifier E1 in the row 126-1, and thus one entity instance identifier from each pair of entity instance identifiers in the coupled set matches an entity instance identifier from another pair of entity instance identifiers in the coupled set. Therefore, the set 128-1 comprises a coupled set. The set 128-2 comprises the row 124-1 from the entity reference relationship structure 114-3 and the row 126-2 from the entity reference relationship structure 114-1. Note that the entity instance identifier E1 in the row 124-1 does not match any entity instance identifier in any other pair of entity instance identifiers in the set 128-2, nor does the entity instance identifier C1 in the row 124-1 match any entity instance identifier in any other pair of entity instance identifiers in the set 128-2. Thus, the set 128-2 is not a coupled set. The set 128-3 comprises the row 124-2 from the entity reference relationship structure 114-3 and the row 126-2 from the entity reference relationship structure 114-1. Note that the entity instance identifier E2 in the row 124-2 matches the entity instance identifier E2 in the row 126-2. Thus, the set 128-3 comprises a coupled set. While all possible sets are not illustrated for purposes of brevity, coupled sets 128-1 and 128-3 are the only coupled sets that can be identified in the path 122.

For each coupled set 128-1, 128-3, the entity instance identifier that identifies an entity instance in the entity structure that corresponds to the first vertex, and the entity instance identifier that identifies an entity instance in the entity structure that corresponds to the second vertex, are stored in a new entity reference relationship structure (FIG. 20, step 2006). Thus, with respect to the coupled set 128-1, the entity instance identifier C1, which identifies a computer entity instance 110 in the computer entity structure 104-3 (which corresponds to the first vertex 118-3-V) and the entity instance identifier C1, which identifies an office entity instance 112 in the office entity structure 104-4 (which corresponds to the first vertex 118-4-V), are stored in association with one another in a row 130-1 in the new entity reference relationship structure 114-4.

Similarly, with respect to the coupled set 128-3, the entity instance identifier C2, which identifies a computer entity instance 110 in the computer entity structure 104-3 (which corresponds to the first vertex 118-3-V) and the entity instance identifier O3, which identifies an office entity instance 112 in the office entity structure 104-4 (which corresponds to the first vertex 118-4-V), are stored in association with one another in a row 130-2 in the new entity reference relationship structure 114-4. Note that such entity instance identifiers may optionally be stored in an interim result set 132. Because the path 122 is the only path between the vertexes corresponding to the computer entity structure 104-3 and the office entity structure 104-4, the new entity reference relationship structure 114-4 is complete.

Figure 23:
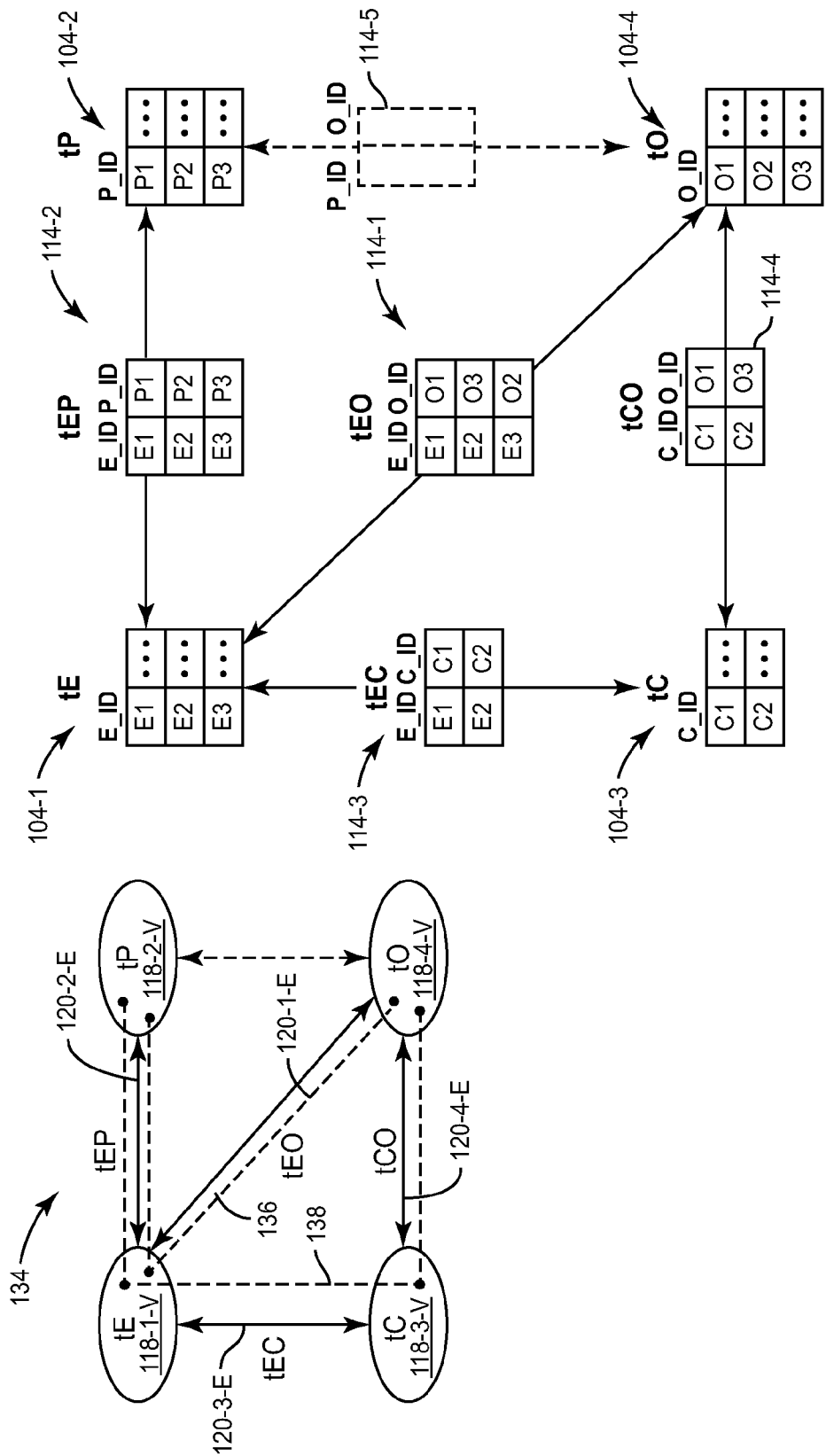
FIG. 23 is a graph that identifies the known relationships among the entity structures illustrated in FIG. 19 based on the entity reference relationship structures, after the generation of the entity reference relationship structure 114-4, and illustrates how particular entity structures and entity reference relationship structures correspond to the vertices and edges depicted by the graph.

FIG. 23 illustrates a graph 134 that identifies the known relationships among the entity structures 104 based on the entity reference relationship structures 114, after the generation of the entity reference relationship structure 114-4, and how particular entity structures 104 and entity reference relationship structures 114 correspond to the vertices 118 and the edges 120 depicted by the graph 134. The process for determining the entity reference relationship structure 114-5 (FIG. 17) that will identify relationships between phone entity instances 108 of the phone entity structure 104-2 and entity instances 112 of the office entity structure 104-4 will now be discussed.

The database relationship analyzer 12 (FIG. 1) determines that two paths 136, 138 extend, or travel, from the vertex 118-2-V (corresponding to the phone entity structure 104-2) to the vertex 118-4-V (corresponding to the office entity structure 104-4.) The path 136 comprises the first vertex 118-2-V, an edge 120-2-E (which corresponds to the entity reference relationship structure 114-2), an intermediate vertex 118-1-V (which corresponds to the employee entity structure 104-1), an edge 120-1-E (which corresponds to the entity reference relationship structure 114-1), and the second vertex 118-4-V. The path 138 comprises first vertex 118-2-V, the edge 120-2-E, a first intermediate vertex 118-1-V, an edge 120-3-E (which corresponds to the entity reference relationship structure 114-3), a second intermediate vertex 118-3-V (which corresponds to the computer entity structure 104-3), an edge 120-4-E (which corresponds to the entity reference relationship structure 114-4), and the second vertex 118-4-V.

Figure 24:
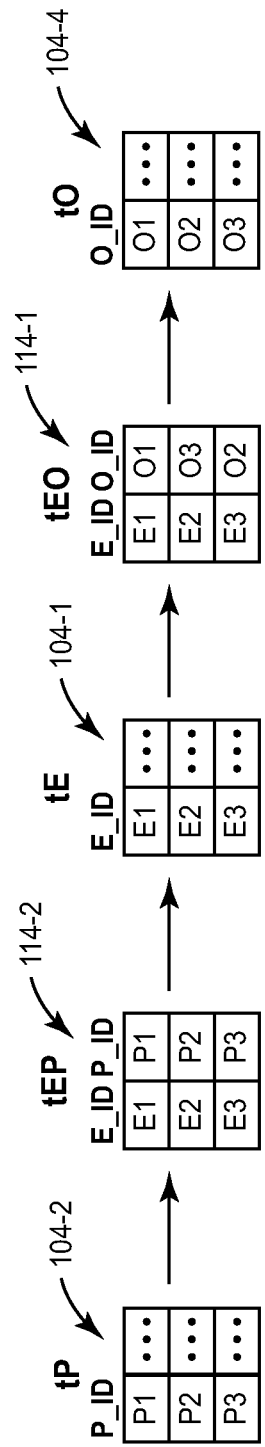
FIG. 24 is a block diagram illustrating the correspondence of the vertices and edges in the path 136 with particular entity structures and entity reference relationship structures, according to one embodiment.
Figure 25:
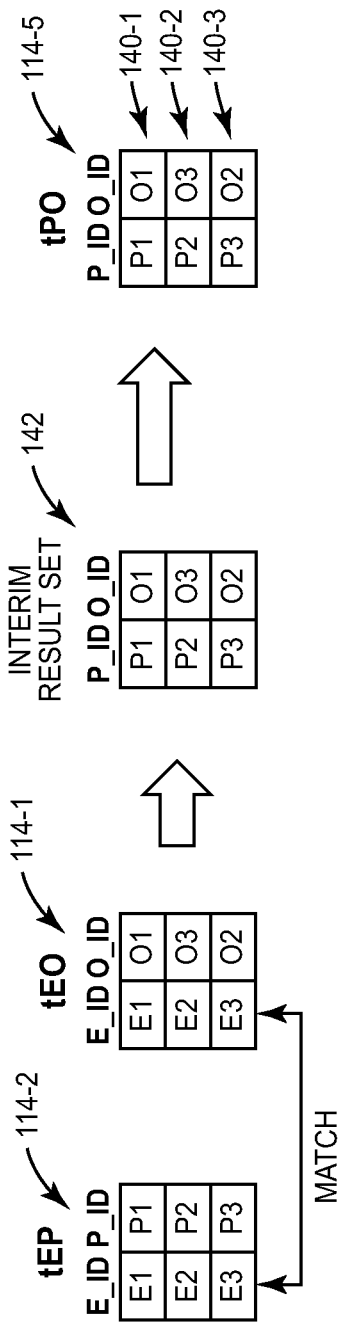
FIG. 25 is a block diagram illustrating the coupled sets that are determined based on the entity reference relationship structures that correspond to the path 136, according to one embodiment.

FIG. 24 illustrates the correspondence of the vertices 118 and the edges 120 in the path 136 with the entity structures 104 and the entity reference relationship structures 114. FIG. 25 illustrates the coupled sets that are determined based on the entity reference relationship structures 114-2 and 114-1 that correspond to the path 136. Based on the process described with respect to FIG. 22, three coupled sets are determined and stored in association with one another in the new entity reference relationship structure 114-5 as rows 140-1-140-3. As discussed above, the database relationship analyzer 12 may preliminarily store such coupled sets in an interim result set 142.

Figure 26:
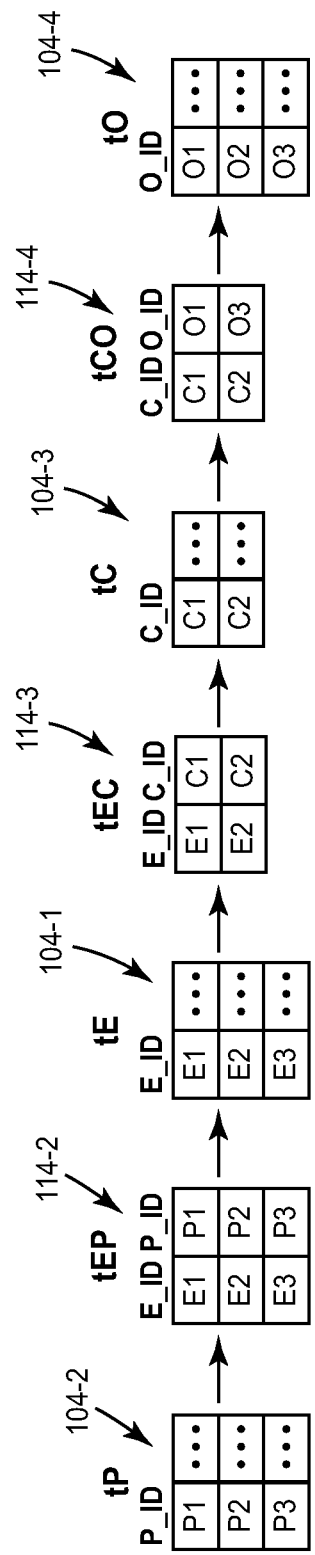
FIG. 26 is a block diagram illustrating the correspondence of the vertices and edges in the path 138 with particular entity structures and entity reference relationship structures, according to one embodiment.
Figure 27:
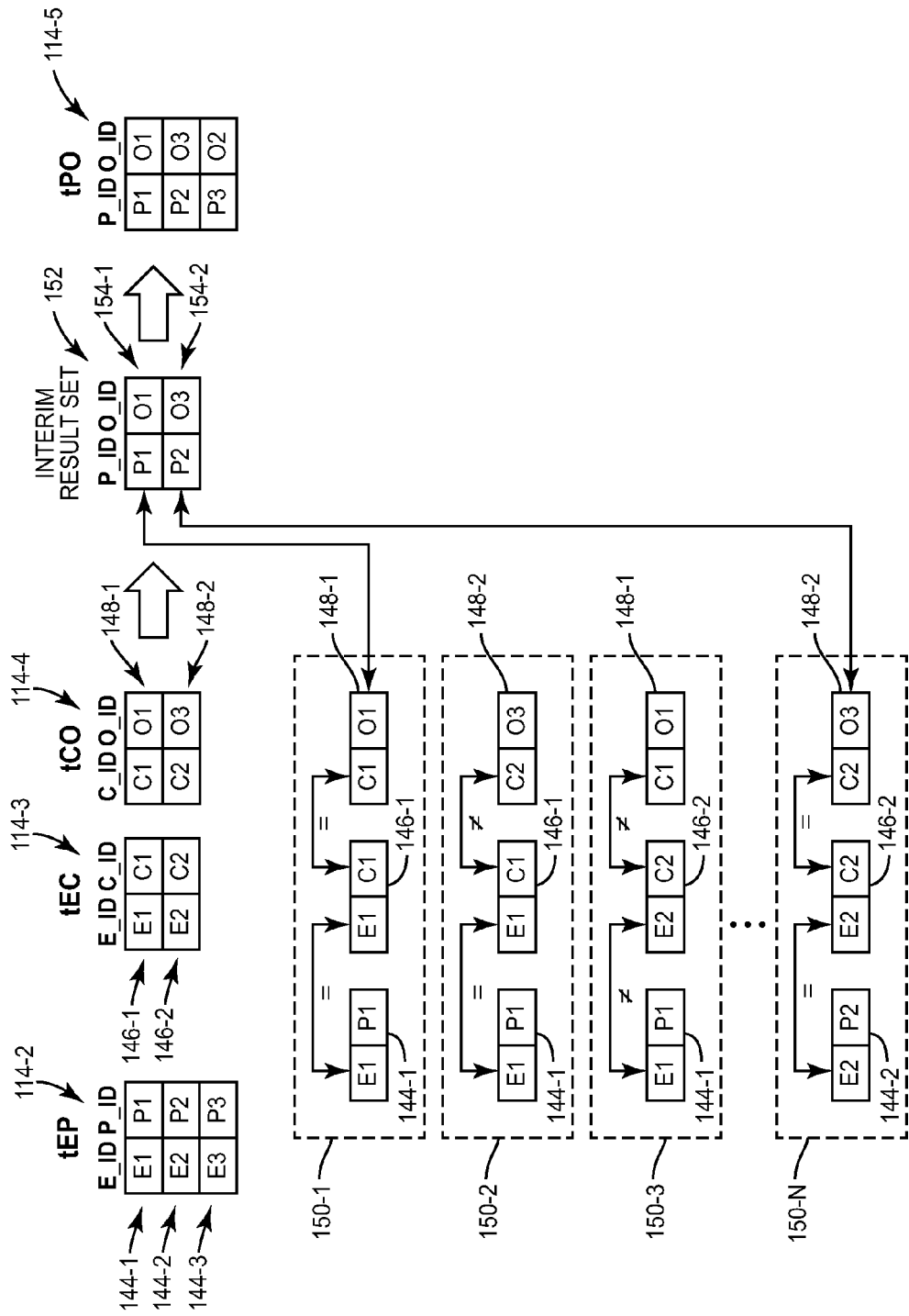
FIG. 27 is a block diagram illustrating the determination of coupled sets for the path 138 according to one embodiment.

FIG. 26 illustrates the correspondence of the vertices 118 and the edges 120 in the path 138 with the entity structures 104 and the entity reference relationship structures 114. FIG. 27 is a block diagram illustrating the determination of coupled sets for the path 138 according to one embodiment. The path 138 includes the edges 120-2-E, 120-3-E, and 120-4-E, which correspond, respectively, to entity reference relationship structures 114-2, 114-3, and 114-4. The entity reference relationship structure 114-2 comprises three pairs, or rows 144-1-144-3; the entity reference relationship structure 114-3 comprises two pairs, or rows 146-1-146-2; and the entity reference relationship structure 114-4 comprises two pairs, or rows 148-1-148-2. Consequently, a total of twelve (i.e., 3*2*2) possible sets of pairs of entity instance identifiers comprising one pair of entity instance identifiers from each of the three entity reference relationship structures 114-2-114-4 may be formed.

For purposes of illustration, four such sets 150-1-150-3 and 150-N are illustrated. The set 150-1 comprises the rows 144-1, 146-1, and 148-1. Note that the entity instance identifier E1 in the row 144-1 matches the entity instance identifier E1 in the row 146-1, and the entity instance identifier C1 in the row 146-1 matches the entity instance identifier C1 in the row 148-1. Thus, the set 150-1 comprises pairs of entity instance identifiers wherein at least one entity instance identifier from each pair of entity instance identifiers in the coupled set matches an entity instance identifier from another pair of entity instance identifiers in the coupled set, and thus constitutes a coupled set. The entity instance identifier in the coupled set 140-1 that identifies an entity instance in the entity structure that corresponds to the first vertex (i.e, P1), and the entity instance identifier that identifies an entity instance in the entity structure that corresponds to the second vertex (i.e., O1), may be stored in association with one another in an interim result set 152 as a row 154-1.

The set 150-2 comprises the rows 144-1, 146-1, and 148-2. Note that the entity instance identifier C1 in the row 146-1 does not match any entity instance identifier in any other pair of entity instance identifiers in the set 150-2, and thus the set 140-2 is not a coupled set. The set 150-3 comprises the rows 144-1, 146-2, and 148-1. Note that the entity instance identifier E1 in the row 144-1 does not match any entity instance identifier in any other pair of entity instance identifiers in the set 150-3, and thus the set 150-3 is not a coupled set.

The set 150-N comprises the rows 144-2, 146-2, and 148-2. Note that the entity instance identifier E2 in the row 144-2 matches the entity instance identifier E2 in the row 146-2, and the entity instance identifier C2 in the row 146-2 matches the entity instance identifier C2 in the row 148-2. Thus, the set 150-4 comprises pairs of entity instance identifiers wherein at least one entity instance identifier from each pair of entity instance identifiers in the coupled set matches an entity instance identifier from another pair of entity instance identifiers in the coupled set, and thus constitutes a coupled set. The entity instance identifier in the coupled set 150-N that identifies an entity instance in the entity structure that corresponds to the first vertex (i.e, P2), and the entity instance identifier that identifies an entity instance in the entity structure that corresponds to the second vertex (i.e., O3), may be stored in association with one another in the interim result set 152 as a row 154-2.

The database relationship analyzer 12 may then determine that each of the pairs of entity instance identifiers identified from the coupled sets 150-1 and 150-N, and reflected in rows 154-1 and 154-2 of the interim result set 152, is already reflected in the entity reference relationship structure 114-5, and thus the path 138 yielded no additional entries for the entity reference relationship structure 114-5.

While for purposes of illustration, a relatively simple 1:1 entity structure group of entity structures 104 has been shown, it should be apparent that a 1:1 entity structure group may comprise tens, or hundreds, of entity structures 104, and that many paths may be formed from a first entity structure 104 to a second entity structure 104. In such a situation, the database relationship analyzer 12 processes the entity reference relationship structures corresponding to each such path, similar to that described herein with respect to paths 136 and 138, to generate a new entity reference relationship structure that identifies the relationships between the entity instance identifiers of the first entity structure 104 and the entity instance identifiers of the second entity structure 104.

Figure 28:
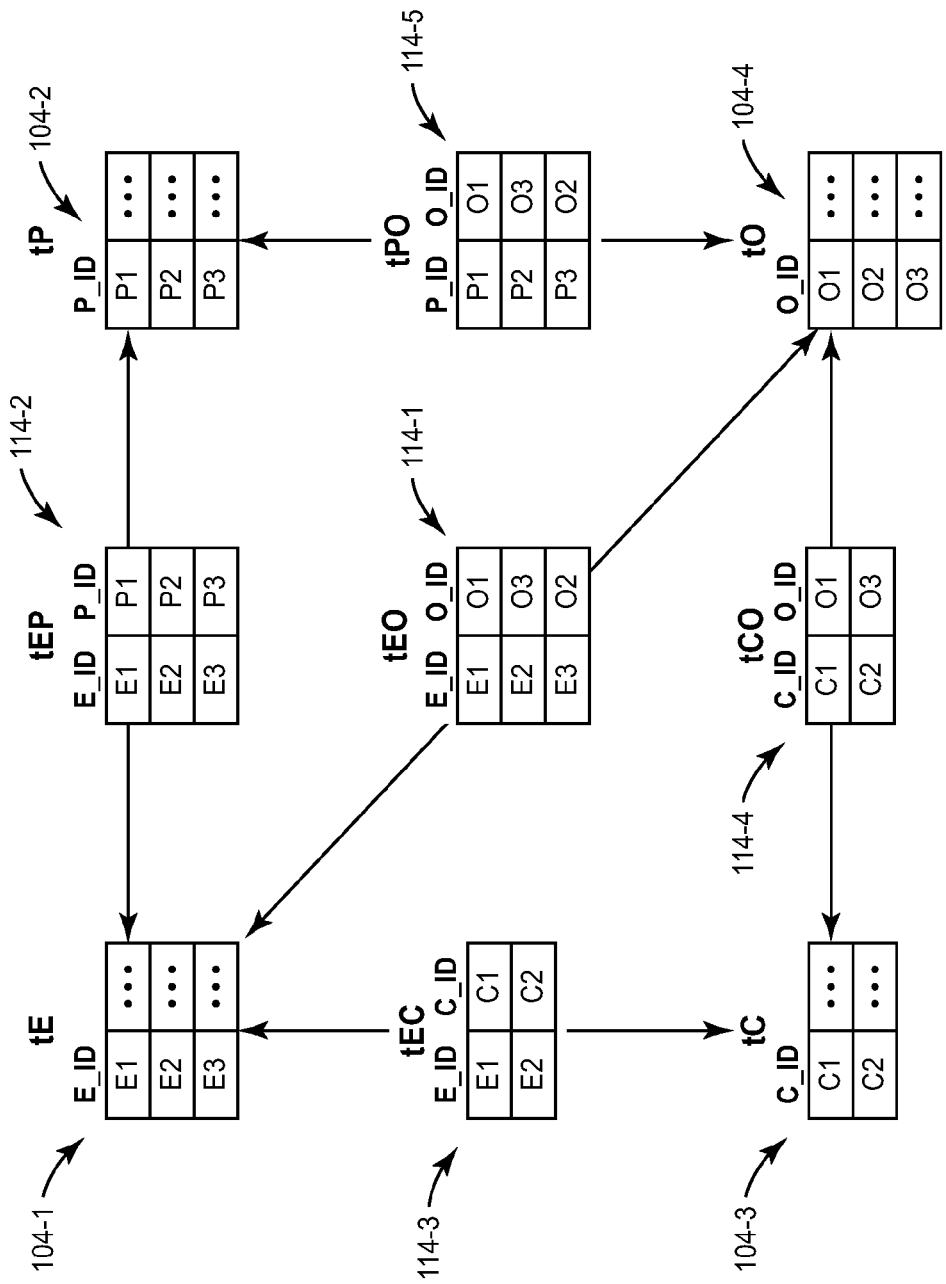
FIG. 28 is a block diagram illustrating the relationships between entity structures and entity reference relationship structures after the generation of the entity reference relationship structures 114-4 and 114-5.

FIG. 28 illustrates the relationships between the entity structures 104 and the entity reference relationship structures 114 after the generation of the entity reference relationship structures 114-4 and 114-5.

Figure 29:
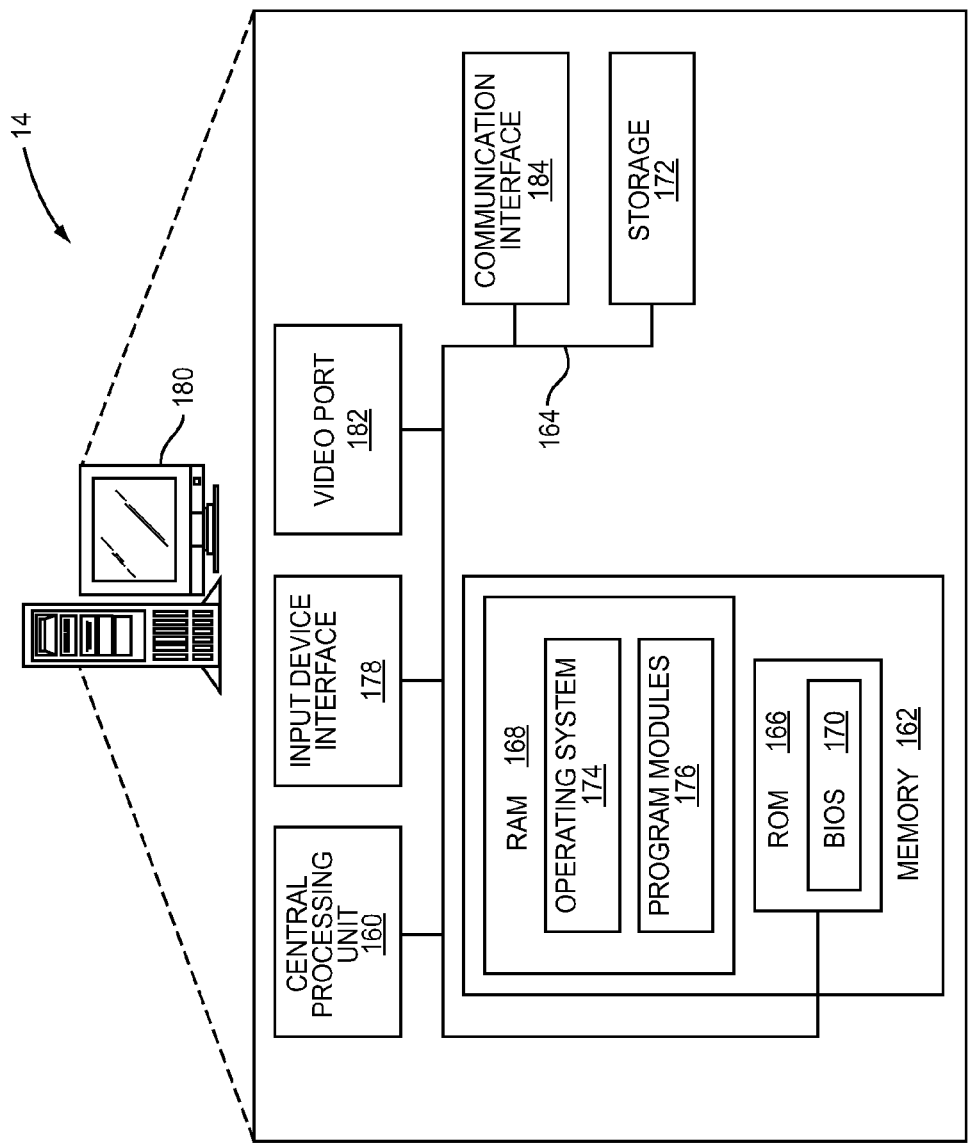
FIG. 29 is a block diagram illustrating an exemplary computing device according to one embodiment.

FIG. 29 illustrates the exemplary computing device 14 according to one embodiment. The computing device 14 may comprise, for example, a laptop computer, a desktop computer, a workstation, a proprietary mainframe computer, a telecommunications switch, or the like. In addition to components discussed previously herein, the exemplary computing device 14 may also include a processor, such as a central processing unit 160, a system memory 162, and a system bus 164. The system bus 164 provides an interface for system components including, but not limited to, the system memory 162 and the central processing unit 160. The central processing unit 160 can be any of various commercially available or proprietary processors. Dual microprocessors and other multi-processor architectures may also be employed as the central processing unit 160.

The system bus 164 may be any of several types of bus structures that may further interconnect to a memory bus (with or without a memory controller), a peripheral bus, and/or a local bus using any of a variety of commercially available bus architectures. The system memory 162 may include non-volatile memory 166 (e.g., read only memory (ROM), erasable programmable read only memory (EPROM), electrically erasable programmable read only memory (EEPROM), etc.) and/or volatile memory 168 (e.g., random access memory (RAM)). A basic input/output system (BIOS) 170 may be stored in the non-volatile memory 166, and can include the basic routines that help to transfer information between elements within the computing device 14. The volatile memory 168 may also include a high-speed RAM such as static RAM for caching data.

The computing device 14 may further include a computer-readable storage 172, which may comprise, for example, an internal hard disk drive (HDD) (e.g., enhanced integrated drive electronics (EIDE) or serial advanced technology attachment (SATA)) for storage, flash memory, or the like. The database 16 or 100 may be stored in the computer-readable storage 172. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 172 and in the volatile memory 168, including an operating system 174 and one or more program modules 176, which may implement the functionality described herein in whole or in part, including, for example, functionality described with respect to the database relationship analyzer 12 (FIG. 1), and other processing and functionality described herein. It is to be appreciated that the embodiments can be implemented with various commercially available operating systems 174 or combinations of operating systems 174.

All or a portion of the embodiments may be implemented as a computer program product stored on a non-transitory computer-usable or computer-readable medium, and including instructions configured to cause a processor to carry out the steps described herein. Thus, the computer-readable program code can comprise software instructions for implementing the functionality of the embodiments described herein when executed on the central processing unit 160. The central processing unit 160, in conjunction with the program modules 176 in the volatile memory 168, may serve as a control system for the computing device 14 that is configured to, or adapted to, implement the functionality described herein.

Alternately, all or a portion of the database relationship analyzer 12 may be implemented in hardware, such as in a special-purpose database processor designed specifically to implement the functionality discussed herein.

An administrator may be able to enter commands and information into the computing device 14 through one or more input devices, such as, for example, a touch sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 160 through an input device interface 178 that is coupled to the system bus 164, but can be connected by other interfaces such as a parallel port, an IEEE 13114 serial port, a game port, a universal serial bus (USB) port, an IR interface, etc.

The computing device 14 may drive a separate or integral display 180, which may also be connected to the system bus 164 via an interface, such as a video port 182. The computing device 14 preferably includes a communication interface 184 for communicating with the network 18 (FIG. 1), which may comprise, for example a wireless LAN or wireless personal area network technology, including, for example, Wi-Fi®, Bluetooth®, or ZigBee®.

Those skilled in the art will recognize improvements and modifications to the preferred embodiments of the present disclosure. All such improvements and modifications are considered within the scope of the concepts disclosed herein and the claims that follow.

What is claimed is:

1. A method for generating a data structure that identifies relationships between entity instances in a first entity structure and entity instances in a second entity structure, comprising:
  accessing, by a computing device, a database comprising at least three entity reference relationship structures, each of the at least three entity reference relationship structures establishing a relationship between a different pair of entity structures of at least four entity structures which form a one-to-one entity structure group, wherein entity instances in each entity structure of the one-to-one entity structure group have a one-to-one relationship with entity instances of another entity structure in the one-to-one entity structure group;
  determining, automatically by the computing device, each different path from a first vertex that corresponds to the first entity structure through at least one intermediate vertex that corresponds to an intermediate entity structure to a second vertex that corresponds to the second entity structure, wherein the each different path comprises a plurality of edges, each respective edge connecting two vertices and corresponding to an entity reference relationship structure that establishes a relationship between two entity structures that correspond to the two vertices connected by the respective edge, a quantity of different paths comprising at least two different paths;
  for each said different path, automatically identifying, by the computing device, all coupled sets of pairs of entity instance identifiers, wherein each coupled set comprises a pair of entity instance identifiers from each entity reference relationship structure corresponding to the each said path, wherein at least one entity instance identifier from each pair of entity instance identifiers in the coupled set matches an entity instance identifier from another pair of entity instance identifiers in the coupled set; and
  for each said coupled set, storing a first entity instance identifier in the each coupled set that refers to the first entity structure and a second entity instance identifier in the each coupled set that refers to the second entity structure in association with one another in a new entity reference relationship structure.

2. The method of claim 1, wherein, for each coupled set, storing the first entity instance identifier in the each coupled set that refers to the first entity structure and the second entity instance identifier in the each coupled set that refers to the second entity structure in association with one another in the new entity reference relationship structure further comprises:
  for each coupled set, storing the first entity instance identifier in the each coupled set that refers to the first entity structure and the second entity instance identifier in the each coupled set that refers to the second entity structure in association with one another in the entity reference relationship structure if the first entity instance identifier and the second entity instance identifier have not already been stored in association with each other in the new entity reference relationship structure.

3. The method of claim 1, wherein at least one path of the each different path comprises three edges.

4. The method of claim 1, wherein the new entity reference relationship structure comprises a table in a relational database.

5. The method of claim 1, wherein each entity instance in the first entity structure has at most one relationship with any entity instance in the second entity structure, and wherein each entity instance in the second entity structure has at most one relationship with any entity instance in the first entity structure.

6. A method for generating an entity reference relationship structure between a first entity structure and second entity structure of at least four entity structures which form a one-to-one entity structure group, comprising:
  accessing, by a computing device, a database comprising at least three entity reference relationship structures, each of the at least three entity reference relationship structures establishing a relationship between one entity structure and another entity structure and comprising pairs of entity instance identifiers, a first entity instance identifier in each pair of entity instance identifiers referring to an entity instance in the one entity structure and the second entity instance identifier of the each pair referring to an entity instance of the another entity structure, wherein entity instances in each entity structure of the one-to-one entity structure group have a one-to-one relationship with entity instances of another entity structure in the one-to-one entity structure group;
  determining, automatically by the computing device, each different path from the first entity structure to the second entity structure wherein the each different path comprises a plurality of edges, each edge corresponding to an entity reference relationship structure and connecting two vertices which correspond to entity structures between which the entity reference relationship structure establishes the relationship, and wherein a beginning vertex in the each path corresponds to the first entity structure and an ending vertex in the each path corresponds to the second entity structure, a quantity of different paths comprising at least two different paths;
  for each said path, automatically identifying, by the computing device, all coupled sets of pairs of entity instance identifiers, wherein each coupled set comprises a pair of entity instance identifiers from each entity reference relationship structure corresponding to the each path wherein at least one entity instance identifier from each pair of entity instance identifiers in the coupled set matches an entity instance identifier from another pair of entity instance identifiers in the coupled set, wherein at least one entity instance identifier from each pair of entity instance identifiers in the coupled set matches an entity instance identifier from another pair of entity instance identifiers in the coupled set; and
  for each said coupled set, storing a first entity instance identifier in the each coupled set that refers to the first entity structure and a second entity instance identifier in the each coupled set that refers to the second entity structure in association with one another in a new entity reference relationship structure if the first entity instance identifier and the second entity instance identifier have not already been stored in association with each other in the new entity reference relationship structure.

7. The method of claim 6, wherein the new entity reference relationship structure comprises a table in a relational database.

8. The method of claim 6, wherein each entity instance in the first entity structure has at most one relationship with any entity instance in the second entity structure, and wherein each entity instance in the second entity structure has at most one relationship with any entity instance in the first entity structure.

9. A computer program product for determining relationships between entity instances in a database, the computer program product stored on a non-transitory computer-readable storage medium and including instructions configured to cause a processor to carry out the steps of:
  accessing, by a computing device, a database comprising at least three entity reference relationship structures, each of the at least three entity reference relationship structures establishing a relationship between a different pair of entity structures of at least four entity structures which form a one-to-one entity structure group, wherein entity instances in each entity structure of the one-to-one entity structure group have a one-to-one relationship with entity instances of another entity structure in the one-to-one entity structure group;
  determining, automatically by the computing device, each different path from a first vertex that corresponds to a first entity structure through at least one intermediate vertex that corresponds to an intermediate entity structure to a second vertex that corresponds to a second entity structure, wherein the each different path comprises a plurality of edges, each respective edge connecting two vertices and corresponding to an entity reference relationship structure that establishes a relationship between the two entity structures that correspond to the two vertices connected by the respective edge, a quantity of different paths comprising at least two different paths;
  for each said different path, automatically identifying, by the computing device, all coupled sets of pairs of entity instance identifiers, wherein each coupled set comprises a pair of entity instance identifiers from each entity reference relationship structure corresponding to the each said path, wherein at least one entity instance identifier from each pair of entity instance identifiers in the coupled set matches an entity instance identifier from another pair of entity instance identifiers in the coupled set; and
  for each said coupled set, storing a first entity instance identifier in the each coupled set that refers to the first entity structure and a second entity instance identifier in the each coupled set that refers to the second entity structure in association with one another in a new entity reference relationship structure.

10. The computer program product of claim 9, wherein, for the each coupled set, to store the first entity instance identifier in the each coupled set that refers to the first entity structure and the second entity instance identifier in the each coupled set that refers to the second entity structure in association with one another in the entity reference relationship structure, the instructions are further configured to cause the processor to carry out the steps of:
  for each said coupled set, storing the first entity instance identifier in the each coupled set that refers to the first entity structure and the second entity instance identifier in the each coupled set that refers to the second entity structure in association with one another in the entity reference relationship structure if the first entity instance identifier and the second entity instance identifier have not already been stored in association with each other in the entity reference relationship structure.

11. The computer program product of claim 9, wherein at least one path of the each different path comprises three edges.

12. A computing device comprising:
  a communications interface adapted to communicate with a network; and
  a control system comprising a processor and coupled to the communications interface, and adapted to:
    access a database comprising at least three entity reference relationship structures, each of the at least three entity reference relationship structures establishing a relationship between a different pair of entity structures of at least four entity structures which form a one-to-one entity structure group, wherein entity instances in each entity structure of the one-to-one entity structure group have a one-to-one relationship with entity instances of another entity structure in the one-to-one entity structure group;
    determine automatically each different path from a first vertex that corresponds to a first entity structure through at least one intermediate vertex that corresponds to an intermediate entity structure to a second vertex that corresponds to a second entity structure, wherein the each different path comprises a plurality of edges, each respective edge connecting two vertices and corresponding to an entity reference relationship structure that establishes a relationship between the two entity structures that correspond to the two vertices connected by the respective edge, a quantity of different paths comprising at least two different paths;
    for each said different path, automatically identify all coupled sets of pairs of entity instance identifiers, wherein each coupled set comprises a pair of entity instance identifiers from each entity reference relationship structure corresponding to the each said path, wherein at least one entity instance identifier from each pair of entity instance identifiers in the coupled set matches an entity instance identifier from another pair of entity instance identifiers in the coupled set; and
    for each said coupled set, store a first entity instance identifier in the each coupled set that refers to the first entity structure and a second entity instance identifier in the each coupled set that refers to the second entity structure in association with one another in a new entity reference relationship structure.

13. The computing device of claim 12, wherein, for each coupled set, to store the first entity instance identifier in the each coupled set that refers to the first entity structure and the second entity instance identifier in the each coupled set that refers to the second entity structure in association with one another in the entity reference relationship structure, the control system is further adapted to:
  for each said coupled set, store the first entity instance identifier in the each coupled set that refers to the first entity structure and the second entity instance identifier in the each coupled set that refers to the second entity structure in association with one another in the entity reference relationship structure if the first entity instance identifier and the second entity instance identifier have not already been stored in association with each other in the entity reference relationship structure.

14. The computing device of claim 12, wherein at least one path of the each different path comprises three edges.

\* \* \* \* \*